US011964257B2

(12) United States Patent
Zhou et al.

(10) Patent No.: US 11,964,257 B2
(45) Date of Patent: Apr. 23, 2024

(54) CERIA-SUPPORTED METAL CATALYSTS AND PROCESSES

(71) Applicant: University of Wyoming, Laramie, WY (US)

(72) Inventors: Jing Zhou, Laramie, WY (US); Joseph Holles, Laramie, WY (US); Richard Horner, Laramie, WY (US); Jintao Miao, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 526 days.

(21) Appl. No.: 17/082,406

(22) Filed: Oct. 28, 2020

(65) Prior Publication Data
US 2021/0121854 A1    Apr. 29, 2021

Related U.S. Application Data

(60) Provisional application No. 63/069,471, filed on Aug. 24, 2020, provisional application No. 62/957,962, (Continued)

(51) Int. Cl.
*B01J 23/10*        (2006.01)
*B01J 23/755*       (2006.01)
(Continued)

(52) U.S. Cl.
CPC ............ *B01J 23/10* (2013.01); *B01J 23/755* (2013.01); *C01B 3/40* (2013.01); *C01B 32/40* (2017.08);
(Continued)

(58) Field of Classification Search
CPC ......... B01J 23/10; B01J 23/755; C01B 32/40; C01B 3/40; C01B 2203/0227;
(Continued)

(56) References Cited

U.S. PATENT DOCUMENTS

2006/0216227 A1 * 9/2006 Idem .................. C01B 3/16
                                                              423/652
2017/0001176 A1 * 1/2017 D'Souza ............. B01J 35/023
(Continued)

FOREIGN PATENT DOCUMENTS

EP        1920830    *  5/2008
EP        2886514    *  6/2015
WO    WO 2019/055529     3/2019

OTHER PUBLICATIONS

Combined magnesia, ceria and nickel catalyst supported over gamma alumina doped with titania for dry reforming of methand Ahmed Sadeq Al-Fatesh et al. Catalysts, 188,9 (Year: 2019).*
(Continued)

*Primary Examiner* — Douglas B Call
(74) *Attorney, Agent, or Firm* — Leydig Voit & Mayer, Ltd.

(57) ABSTRACT

Provided herein are catalyst materials and processes for processing hydrocarbons. For example, doped ceria-supported metal catalysts are provided exhibiting good activity and stability for commercially relevant DRM process conditions including low temperature and long term operation.

12 Claims, 16 Drawing Sheets

Related U.S. Application Data filed on Jan. 7, 2020, provisional application No. 62/927,518, filed on Oct. 29, 2019.

(51) Int. Cl.
    *C01B 3/40*     (2006.01)
    *C01B 32/40*     (2017.01)

(52) U.S. Cl.
    CPC ............... *C01B 2203/0227* (2013.01); *C01B 2203/0277* (2013.01); *C01B 2203/0283* (2013.01); *C01B 2203/061* (2013.01); *C01B 2203/1058* (2013.01); *C01B 2203/1082* (2013.01); *C01B 2203/1241* (2013.01)

(58) Field of Classification Search
    CPC .... C01B 2203/0277; C01B 2203/0286; C01B 2203/061; C01B 2203/1058; C01B 2203/1082; C01B 2203/1241
    USPC .......................................................... 502/335
    See application file for complete search history.

(56) References Cited

U.S. PATENT DOCUMENTS

| | | | |
|---|---|---|---|
| 2019/0144765 A1* | 5/2019 | Marker ..................... | C10L 3/08 585/899 |
| 2022/0269233 A1 | 8/2022 | Braedt et al. | |
| 2022/0324707 A1 | 10/2022 | Zhou et al. | |

OTHER PUBLICATIONS

Hydrogen production by methane tri-reforming process over Ni-ceria catalysts: Effect of La-doping Lidia Pino et al Applied Catalyst B: Environmental, v104, pp. 64-73 (Year: 2011).*
Machine translation of EP2886514 pp. 1-33 downloaded Jun. 30, 2023 (Year: 2015).*
Braedt et al. (2021) "Dry Reforming of C1—C3 Hydrocarbons over Ni Particles on Ti-doped Ceria," Abstract and poster presentation on Apr. 5, 2021 at ACS Spring 2021 (Macromolecular Chemistry: The second Century), Apr. 5-16, 2021; Division of Energy and Fuels; C1 Catalysis.
Liu et al. (Dec. 2018) "Nickel Supported Modified Ceria Zirconia Lanthanum/Praseodymium/Yttrium Oxides Catalysts for Syngas Production through Dry Methane Reforming," Materials Science Forum, 941, 2214-2219.
Menegazzo et al. (Nov. 2018) "Development of La Doped Ni/$CeO_2$ for $CH_4/CO_2$ Reforming," Journal of Carbon Research, 4, 60.
Mousavi et al. (Mar. 2018) "Preparation of nanocrystalline Zr, La and Mg-promoted 10% Ni/$Ce_{0.95}Mn_{0.05}O_2$ catalysts for syngas production via dry reforming reaction," International Journal of Hydrogen Energy 43(13), 6532-6538.
U.S. Appl. No. 17/674,700, filed Feb. 17, 2022.
U.S. Appl. No. 17/711,365, filed Apr. 1, 2022.
Abdullah et al. (2017) "Recent Advances in Dry Reforming of Methane over Ni-Based Catalysts," J. Clean. Prod., 162, 170-185.
Araiza et al. (Jun. 2019) "Dry Reforming of Methane over Pt—Ni/CeO2 Catalysts: Effect of the Metal Composition on the Stability," Catal. Today, 360, 46-54.
Ay et al. (2015) "Dry Reforming of Methane over CeO2 Supported Ni, Co and Ni—Co Catalysts," Appl. Catal. B: Environ., 179, 128-138.
Aziz et al. (Jan. 2020) "Understanding the Role of Surface Basic Sites of Catalysts in CO2 Activation in Dry Reforming of Methane: A Short Review," Catal. Sci. Technol., 10, 35-45.
Cai et al. (2014) "Highly Dispersed Nickel-Containing Mesoporous Silica with Superior Stability in Carbon Dioxide Reforming of Methane: The Effect of Anchoring," Materials, 7, 2340-2355.
Damaskinos et al. (Jun. 2019) "The Effect of $Ti^{4+}$ Dopant in the 5 wt% Ni/$Ce_{1-x}Ti_xO_{2-\delta}$ Catalyst on the Carbon Pathways of Dry Reforming of Methane Studied by Various Transient and Isotopic Techniques," Appl. Catal. A: Gen., 579, 116-129.
Damyanova et al. (2009) "The Effect of $CeO_2$ on the Surface and Catalytic Properties of Pt/$CeO_2$—$ZrO_2$ Catalysts for Methane Dry Reforming," Appl. Catal. B: Environ., 89, 149-159.
Djaidja et al. (2006) "Characterization and Activity in Dry Reforming of Methane on NiMg/Al and Ni/MgO Catalysts," Catal. Today, 113, 194-200.
Djinovic et al. (2012) "Efficient Catalytic Abatement of Greenhouse Gases: Methane Reforming with CO2 Using a Novel and Thermally Stable Rh—CeO2 Catalyst," Int. J. Hydrogen Energy, 37, 2699-2707.
Du et al. (2012) "Morphology Dependence of Catalytic Properties of Ni/CeO2 Nanostructures for Carbon Dioxide Reforming of Methane," J. Phys. Chem. C, 116, 10009-10016.
Ferreira-Aparicio (1999) "A Transient Kinetic Study of the Carbon Dioxide Reforming of Methane over Supported Ru Catalysts," J. Catal., 184, 202-212.
Figueroba et al. (2017) "Metal-Doped Ceria Nanoparticles: Stability and Redox Processes," Phys. Chem. Chem. Phys., 19, 21729-21738.
Garcia-Dieguez et al. (2010) "Nanostructured Pt- and Ni-Based Catalysts for CO2-Reforming of Methane," J. Catal., 270, 136-145.
Gonzalez-DelaCruz et al. (2008) "Morphology Changes Induced by Strong Metal-Support Interaction on a Ni-Ceria Catalytic System," J. Catal., 257, 307-314.
Graciani et al. (2014) "Highly Active Copper-Ceria and Copper-Ceria-Titania Catalysts for Methanol Synthesis from CO2," Science, 345, 6196, 546-550.
Hassani Rad et al. (2016) "Sol-Gel vs. Impregnation Preparation of MgO and CeO2 Doped Ni/Al2O3 Nanocatalysts Used in Dry reforming of Methane: Effect of Process Conditions, Synthesis Method and Support Composition," Int. J. Hydrogen Energy, 41, 5335-5350.
Jahangiri et al. (2014) "A Review of Advanced Catalyst Development for Fischer-Tropsch Synthesis of Hydrocarbons From Biomass Derived Syn-Gas," Catal. Sci. Technol., 4, 2210-2229.
Kambolis et al. (2010) "Ni/$CeO_2$—$ZrO_2$ catalysts for the dry reforming of methane," Applied Catalysis A: General, 377, 16-26.
Kim et al. (2015) "Effect of Ce/Ti ratio on the catalytic activity and stability of Ni/CeO2—TiO2 catalyst for dry reforming of methane," Chemical Engineering Journal, 280, 433-440.
Kumar et al. (2007) "Nickel-Based Ceria, Zirconia, and Ceria-Zirconia Catalytic Systems for Low-Temperature Carbon Dioxide Reforming of Methane," Energy Fuels, 21, 3113-3123.
Lima et al. (2006) "Structural Features of La1—xCexNiO3 Mixed Oxides and Performance for the Dry Reforming of Methane," Appl. Catal. A: Gen., 311, 94-104.
Liu et al. (Mar. 2019) "Highly Active Ceria-Supported Ru Catalyst for the Dry Reforming of Methane: In Situ Identification of $Ru^{\delta+}$—$Ce^{3+}$ Interactions for Enhanced Conversion," ACS Catal., 9, 3349-3359.
Luisetto et al. (2012) "Co and Ni Supported on CeO2 as Selective Bimetallic Catalyst for Dry Reforming of Methane," Int. J. Hydrogen Energy, 37, 15992-15999.
Luisetto et al. (Mar. 2019) "Dry Reforming of Methane over Ni Supported on Doped CeO2: New Insight on the Role of Dopants for CO2 Activation," J. CO2 Util., 30, 63-78.
Lustemberg et al. (2016) "Room-Temperature Activation of Methane and Dry Re-forming with $CO_2$ on Ni—CeO2(111) Surfaces: Effect of $Ce^{3+}$ Sites and Metal-Support Interactions on C—H Bond Cleavage," ACS Catal., 6, 8184-8191.
Mohamedali et al. (Mar. 2018) "Recent Advances in Supported Metal Catalysts for Syngas Production from Methane," ChemEngineering, 2, 9.
Munera et al. (2007) "Kinetic Studies of the Dry Reforming of Methane over the Rh/$La_2O_3$—$SiO_2$ Catalyst," Ind. Eng. Chem. Res., 46, 7543-7549.
Munoz et al. (2017) "Highly Stable Ceria-Zirconia-Yttria Supported Ni Catalysts for Syngas Production by CO2 Reforming of Methane," Appl. Surf. Sci., 426, 864-873.
Pakhare et al. (2014) "A Review of Dry (CO2) Reforming of Methane over Noble Metal Catalysts," Chemical Society Reviews, 43, (22), 7813-7837.

(56) References Cited

OTHER PUBLICATIONS

Pompeo et al. (2007) "Study of Ni and Pt Catalysts Supported on $\alpha$-$Al_2O_3$ and $ZrO_2$ Applied in Methane Reforming with CO2," Appl. Catal. A: Gen., 316, 175-183.

Senanayake et al. (2011) "Water-Gas Shift and CO Methanation Reactions over Ni—CeO2(111) Catalysts," Top. Catal., 54, 34-41.

Senanayake et al. (2016) "Hydrogenation of CO2 to Methanol on $CeO_x$/Cu(111) and ZnO/Cu(111) Catalysts: Role of the Metal-Oxide Interface and Importance of $Ce^{3+}$ Sites," J. Phys. Chem. C, 120, 1778-1784.

Seo (Mar. 2018) "Recent Scientific Progress on Developing Supported Ni Catalysts for Dry (CO2) Reforming of Methane," Catalysts, 8, 110.

Shinde et al. (2014) "Catalytic Performance of Highly Dispersed Ni/TiO2 for Dry and Steam Reforming of Methane," RSC Adv., 4, 4817-4826.

Siahvashi et al. (2013) "Kinetic Study of Propane CO2 Reforming over Bimetallic Mo—Ni/$Al_2O_3$ Catalyst," Ind. Eng. Chem. Res., 52, 15377-15386.

Wang et al. ( (Dec. 2019) "The Importance of Inner Cavity Space within Ni@SiO2 Nanocapsule Catalysts for Excellent Coking Resistance in the High-Space-Velocity Dry Reforming of Methane," Appl. Catal. B: Environ., 259, 118019.

Wang et al. (1996) "Carbon Dioxide Reforming of Methane to Produce Synthesis Gas over Metal-Supported Catalysts: State of the Art," Energy Fuels, 10, 896-904.

Wang et al. (2000) "Carbon Dioxide Reforming of Methane to Synthesis Gas over Supported Rhodium Catalysts: the Effect of Support," Appl. Catal. A: Gen., 204, 143-152.

Wang et al. (2015) "Catalytic Behavior of Supported Ru Nanoparticles on the {100}, {110}, and {111} Facet of CeO2," J. Catal., 329, 177-186.

Wang et al. (2016) "Crystal-Plane Effect of Nanoscale CeO2 on the Catalytic Performance of Ni/CeO2 Catalysts for Methane Dry Reforming," Catal. Sci. Technol., 6, 3594-3605.

Wolfbeisser et al. (2016) "Methane Dry Reforming over Ceria-Zirconia Supported Ni Catalysts," Catal. Today, 277, 234-245.

Xie et al. (May 2019) "Effects of Oxide Supports on the CO2 Reforming of Ethane over Pt—Ni Bimetallic Catalysts," Appl. Catal. B: Environ., 245, 376-388.

Xie et al. (Nov. 2018) "Dry Reforming of Methane over CeO2-Supported Pt—Co Catalysts with Enhanced Activity," Appl. Catal. B: Environ., 236, 280-293.

Xu et al. (2013) "Steam Reforming of Ethanol on Ni/CeO2: Reaction Pathway and Interaction between Ni and the CeO2 Support," ACS Catal., 3, 975-984.

Yan et al. (2016) "Dry Reforming of Ethane and Butane with CO2 over PtNi/CeO2 Bimetallic Catalysts," ACS Catal., 6, 7283-7292.

Yan et al. (Jun. 2019) "Highly Efficient and Stable Ni/CeO2—SiO2 Catalyst for Dry Reforming of Methane: Effect of Interfacial Structure of Ni/CeO2 on SiO2," Appl. Catal. B: Environ., 246, 221-231.

Yentekakis et al. (Apr. 2019) "Effect of Support Oxygen Storage Capacity on the Catalytic Performance of Rh Nanoparticles for CO2 Reforming of Methane," Appl. Catal. B: Environ., 243, 490-501.

Zhang et al. (Jan. 2020) "Effects of Zr Doping into Ceria for the Dry Reforming of Methane over Ni/CeZrO2 Catalysts: In Situ Studies with XRD, XAFS, and AP-XPS," ACS Catal., 10, 3274-3284.

Zhang et al. (May 2020) "Effects of the Surface Adsorbed Oxygen Species Tuned by Rare-Earth Metal Doping on Dry Reforming of Methane over Ni/ZrO2 Catalyst," Appl. Catal. B: Environ., 264, 118522 and 118666.

\* cited by examiner

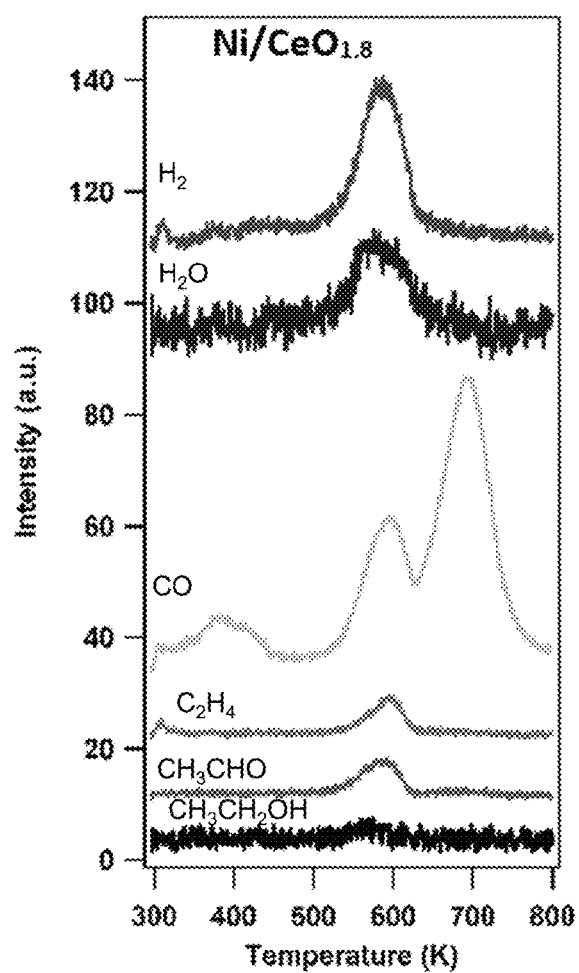
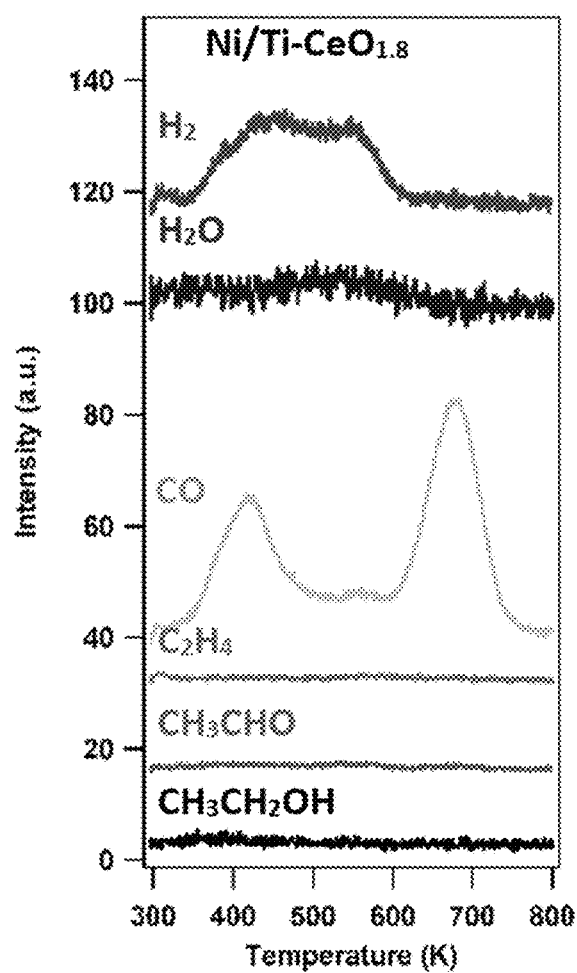
FIG. 1E
FIG. 1F

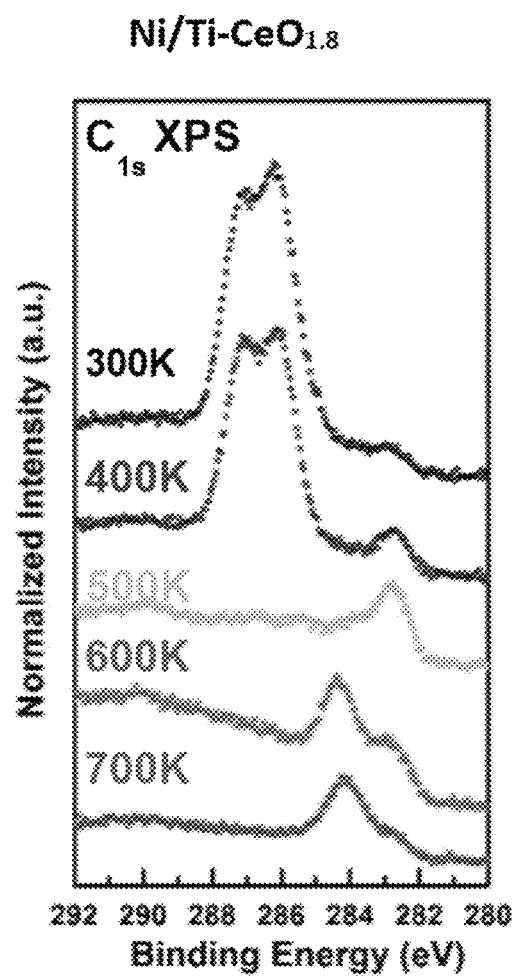
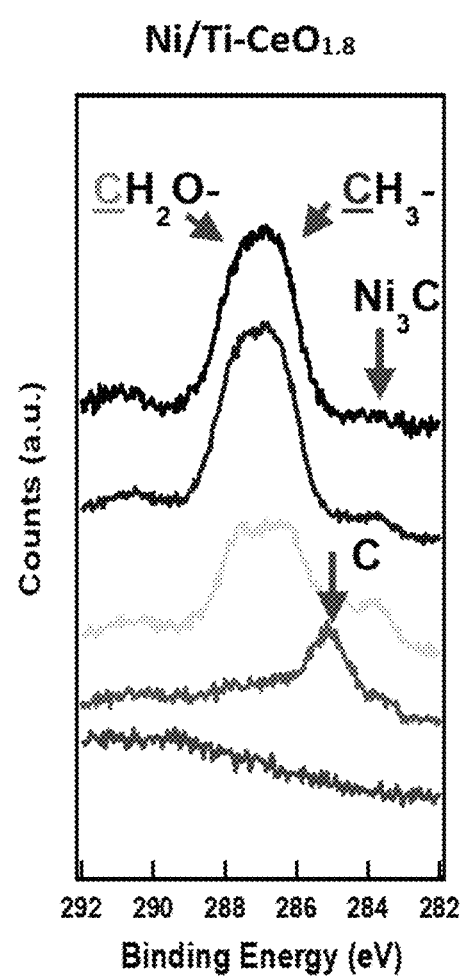
FIG. 1G
FIG. 1H

CERIA-SUPPORTED METAL CATALYSTS AND PROCESSES

CROSS-REFERENCE TO RELATED APPLICATIONS

This application claims the benefit of priority to U.S. Provisional Patent Application Nos. 62/927,518 filed Oct. 29, 2019, 62/957,962 filed Jan. 7, 2020, and 63/069,471, filed Aug. 24, 2020, each of which is hereby incorporated by reference in their entireties to the extent not inconsistent herewith.

STATEMENT REGARDING FEDERALLY SPONSORED RESEARCH OR DEVELOPMENT

This invention was made with government support under Grant no.: CHE 1151846 awarded by the National Science Foundation. The government has certain rights in the invention.

BACKGROUND OF INVENTION

The demand for energy continues to increase due to the rapid rise of the world's population and industrial development. This is coinciding with the use of non-renewable traditional fossil fuels and related production of greenhouse gases with potential environmental impacts. Therefore, it is important to find alternative energy sources to fulfill the energy demand of society that may also address environmental concerns around the production of greenhouse gases.

Dry reforming of methane (DRM) is one of the potential reactions that utilize two greenhouse gases ($CO_2$ and $CH_4$) to produce industrially important syngas (CO and $H_2$), which is utilized to produce liquid fuels, ammonia/urea production, synthetic natural gas, and gaseous fuels. DRM processes produces the syngas of $H_2$:CO with molar ratio closer to 1, which increases the selectivity for production of liquid hydrocarbons using the Fischer-Tropsch process.

Conventional DRM catalytic processes are typically carried out in the presence of a heterogeneous catalyst and often times require high reaction temperatures. Catalysts for DRM include noble metals (e.g., Pt, Rh and Ru) that exhibit high reactivity but are expensive to practically implement on a commercial scale. A class of Ni-based catalysts has also been developed for DRM that exhibit reasonable activity, stability and are less expensive than the corresponding noble metal catalysts (Bardford et al., Appl catal. A 142, 1996, 73-96).

Existing DRM catalysts, such as Ni-based catalysts, are currently limited in some instances by requirements for high reaction temperatures to achieve commercially practicable methane conversion and product yields. Such high temperature requirements significant impacts the overall efficiency achievable using conventional DRM processes. In addition, conventional DRM processes are susceptibility to catalyst degradation and deactivation, for example, due to coke deposition.

As will be evident from the foregoing, new catalyst materials and processes are needed for DMR to realize the benefits of large scale adoption of this technology. Specifically, improved catalyst materials for DRM are needed that are capable of good activity at low temperatures, high thermal stability, and that are economical to commercialize.

SUMMARY OF THE INVENTION

Provided herein are catalyst materials and processes for processing hydrocarbons. For example, doped ceria-supported metal catalysts are provided exhibiting good activity and stability for commercially relevant DRM process conditions including low temperature and long term operation.

In an aspect, catalysts and catalytic processes are provided for the production of a syngas product. For example, methods and catalyst materials are provided for dry reforming of methane, and optionally other hydrocarbons, for the production of a syngas product. Methods of the invention also include catalysts and methods for efficient processing of hydrocarbon-containing feed stocks, including exhausts and other byproducts, derived from important industrial processes.

In an aspect, methods for processing a hydrocarbon feed stock are provided, the method comprising the step of: contacting a feed stock with a doped ceria-supported metal catalyst comprising a doped ceria-supported metal, thereby generating a product comprising $H_2$ and CO; wherein the doped ceria-supported metal catalyst is of the formula (FX1):

$$M/Ce_{1-x}B_xO_{2-\delta} \hspace{2cm} (FX1);$$

wherein M is one or more metals selected from Ni, Co, Pd, Pt or a mixture thereof; B is one or more dopants selected from Ti, Zr, Mn, and La; x is a number selected from the range of 0.05 to 0.5 and wherein δ represents oxygen deficiency; and wherein the feedstock comprises methane with one or more additional hydrocarbon components and $CO_2$, wherein optionally the weight percent of said one or more metals (M) in the catalyst is selected from the range of 0.1-20 wt %, optionally for some embodiments 1.5-7 wt % and optionally for some embodiments 2.0-3 wt %, and/or optionally the ratio of Ce to B is selected from the range of 0.1 to 10, optionally for some embodiments selected from the range of 1 to 3. In an embodiment of this aspect, the process is for production of a syngas product, for example, via a DRM process. In an embodiment, the feed stock is obtained or derived from an industrial process that generates both carbon dioxide and methane. In an embodiment, the feed stock is obtained or derived from an industrial process that generates carbon dioxide, and optionally is in close proximity to a source of methane.

In an aspect, methods for processing a hydrocarbon feed stock are provided, the method comprising the steps of: contacting a feed stock with a doped ceria-supported metal catalyst comprising a doped ceria-supported metal, thereby generating a product comprising $H_2$ and CO; wherein the doped ceria-supported metal catalyst is of the formula (FX1):

$$M/Ce_{1-x}B_xO_{2-\delta} \hspace{2cm} (FX1);$$

wherein M is one or more metals selected from Ni, Co, Pd, Pt or a mixture thereof; B is one or more dopants selected from Ti, Zr, Mn, and La; x is a number selected from the range of 0.05 to 0.5 and wherein δ represents oxygen deficiency; and wherein the feedstock comprises methane and $CO_2$; wherein the feedstock is a byproduct from cement processing, steel processing; coal refining, petrochemical refining, crude oil production, natural gas production, coal mining or minerals mining, such as a product or exhaust (including a processed process or exhaust) from any of these processes. In an embodiment of this aspect, the process is for production of a syngas product, for example, via a DRM process, wherein optionally the weight percent of said one or more metals (M) in the catalyst is selected from the range of 0.1-20 wt %, optionally for some embodiments 1.5-7 wt % and optionally for some embodiments 2.0-3 wt %, and/or optionally the ratio of Ce to B is selected from the range of 0.1 to 10, optionally for some embodiments selected from the range of 1 to 3.

In an aspect, metal supported on doped ceria catalysts are provided, comprising metal particles dispersed over mixed dopant-ceria supports. In an embodiment, for example, a catalyst comprises a doped ceria-supported metal of the formula (FX1): $M/Ce_{1-x}B_xO_{2-\delta}$ (FX1); wherein M is one or more metals selected from Ni, Co, Pd, Pt or a mixture thereof; B is at least two dopants selected from Ti, Zr, Mn and La; x is a number selected from the range of 0.05 to 0.5 and wherein δ represents oxygen deficiency; wherein optionally the weight percent of said one or more metals (M) in the catalyst is selected from the range of 0.1-20 wt %, optionally for some embodiments 1.5-7 wt % and optionally for some embodiments 2.0-3.0 wt %, and/or optionally the ratio of Ce to B is selected from the range of 0.1 to 10, optionally for some embodiments selected from the range of 1 to 3. In an embodiment of this aspect, the catalyst is for processing a hydrocarbon feed stock, for example, via a DRM process.

The present catalysts and process are compatible with a variety of hydrocarbon feed stocks. The ability to process mixed feed stocks provides flexibility with respect to a wide range of the industrial applications that the present catalysts and process may be effectively integrated. In some embodiments, the hydrocarbon feed stock comprises methane and $CO_2$, optionally in combination with other feed stock components such as other hydrocarbons and/or none hydrocarbon components. In an embodiment, for example, the hydrocarbon feedstock comprises methane, $CO_2$, with one or more of ethane, propane, or other hydrocarbons (e.g., aliphatic hydrocarbons, aromatics, etc.). In an embodiment, the hydrocarbon feedstock is natural gas or derived from natural gas.

The present catalysts and process are well suited for processes involving a feed stocks derived from exhaust or emission sources, for example, originating from a range of industrial processes. In an embodiment, the hydrocarbon feedstock is derived from a processing involving production, processing, treatment or combustion of a hydrocarbon fuel. such as a petrochemical fuel, natural gas or coal, or of a mining product such as coal or minerals. In an embodiment, the hydrocarbon feedstock comprises a product, such as an exhaust or byproduct, from one or more processes selected from the group of: a coal pyrolysis process; a petrochemical oxidization process; a sintering process; a furnace process; a kiln process; a steam reforming process; an ammonia production process; a fuel production or treatment process, a mining process and virtually any process that produces carbon dioxide. In some embodiments, the hydrocarbon feed stock is derived from an exhaust or other byproduct that has been treated prior to contact with the DRM catalyst, for example, to remove at least a portion of sulfur and/or nitrogen containing species, such as $SO_x$ and $NO_x$ gases, and or particulate, such as soot. In some embodiments, the hydrocarbon feed stock is $CO_2$ and methane (and/or other hydrocarbons) originating from the same industrial source or industrial process. In some embodiments, the hydrocarbon feed stock is $CO_2$ and methane (and/or other hydrocarbons) originate from different industrial sources or industrial processes located proximate to each other, such as close enough to allow for technically and/or commercially feasible (or attractive) dry reforming of methane using the present methods.

Catalyst if the invention include heterogeneous catalysts, for example including multicomponent catalysts having an active metal particulate component supported by an active support component. Catalysts may comprise metal supported on doped ceria. In some embodiments, doped ceria is the support, which contains dopants like Ti and others, and metals like Ni can be dispersed over the support of doped ceria. In embodiments, for example, the metal may be in an active form of Ni, Co or Pd and, optionally mixtures of these metals. In an embodiment, the metals anchor and/or are disposed over catalytic supports such as ceria or doped ceria. The present processes and catalysts include a class of metal supported on doped ceria catalysts characterized by a range of chemical components and relative amounts of each chemical component. In an embodiment, for example, the doped ceria-supported metal catalyst comprises the one or more metals (M) dispersed over a doped catalyst support characterized by the formula $Ce_{1-x}B_xO_{2-\delta}$, wherein M is one or more metals selected from Ni, Co, Pd, Pt or a mixture thereof; B is one or more dopants selected from Ti, Zr, Mn, and La; x is a number selected from the range of 0.05 to 0.5 and wherein δ represents oxygen deficiency. In an embodiment, the doped catalyst support maintains the structure of pure ceria and produces mixed metal oxides.

In an embodiment, the one or more metals (M) of the catalyst are provided as particles or clusters, for example, particles having an average size dimension (e.g. diameter, effective diameter, etc.) up to 1 micron, optionally up to 500 nm, optionally up to 100 nm and optionally up to 30 nm. In an embodiment, the weight percent of the one or more metals (M) in the catalyst is selected from the range of 0.1-20 wt %, optionally for some embodiments 0.5-10 wt %, optionally for some embodiments 1-5 wt %, optionally for some embodiments 2.0-3.0 wt %, and optionally for some embodiments 1.5-2.5 wt %.

Catalysts and catalytic processes may include metal supported on doped ceria materials including an active component comprising Ni metal particulate. In an embodiment, the one or more metals (M) in formula (FX) is Ni; and wherein Ni has a weight percent in the catalyst selected from the range of 1.5-7 wt %, optionally for some embodiments 2.0-3.0 wt %, optionally for some embodiments 1.5-2.5 wt %. In an embodiment, for example, the one or more metals (M) in formula (FX) is Ni; and Ni has a weight percent in the catalyst of 2.4±0.5%.

Catalysts and catalytic processes may include metal supported on doped ceria materials including an active component comprising a doped ceria support. In an embodiment, the ratio of Ce to B in formula (FX) selected from the range of 0.1 to 10, optionally 0.2 to 5 and optionally 1 to 5 and optionally 1 to 3. In an embodiment, the one or more dopants (B) in formula (FX) is Ti, wherein the ratio of Ce to Ti is selected form the range of 1.5 to 3.0, optionally 2.0 to 2.7. In an embodiment, for example, the one or more dopants (B) in formula (FX) is Ti, wherein the ratio of Ce to Ti is 2.3±0.3.

Catalysts and catalytic processes may include metal supported on doped ceria materials including an active component comprising a doped ceria support having at least two different dopants. In an embodiment, for example, the catalyst is of formula (FX) wherein the one or more dopants is at least two different dopant materials, such as Ti and at least one other dopant selected from Zr, Mn, and La. In an embodiment, for example, the catalyst is of formula (FX) wherein the one or more metals (M) is Ni; wherein the weight percent of Ni in the catalyst is selected from the range of 1.5-2.5 wt %, optionally 2±0.3%; and wherein the ratio of Ce to Ti is selected form the range of 2.0 to 2.7.

The present catalysts may also be characterized by physical properties. In an embodiment, for example, the doped ceria-supported metal catalyst is characterized by a BET surface area selected from the range of 10 $m^2$ $g^{-1}$ to 100 $m^2$ $g^{-1}$.

The present catalysts may be prepared using a variety of techniques. In an embodiment, the doped ceria-supported metal catalyst is produced by one or more processes selected from sol-gel technique, calcination, wet impregnation, or any combination of these. In an embodiment, the doped ceria-supported metal catalyst is produced by sol-gel technique. In an embodiment, the doped ceria-supported metal catalyst is calcined. In an embodiment, the one or more metals (M) is provided via wet impregnation to generate the doped ceria-supported metal.

Catalytic processes of the invention are versatile with respect to process conditions providing effective hydrocarbon processing, including MRP processing, including providing high conversion and product yields at lower reaction temperatures and for long operating periods. In an embodiment, the step of contacting said mixed feed stock with a doped ceria-supported metal catalyst is carried out at a temperature equal to or greater than 600° C., optionally equal to or greater than 650° C., optionally equal to or greater than 700° C., and optionally equal to or greater than 750° C. In an embodiment, the step of contacting said mixed feed stock with a doped ceria-supported metal catalyst is carried out at a temperature selected over the range of 600° C. to 800° C. In an embodiment, the step of contacting the mixed feed stock with a doped ceria-supported metal catalyst is capable of generating the product, such as a syngas product, at a temperature less than or equal 350° C.

In an embodiment, the method is characterized by a methane conversion efficiency equal to or greater than 70% at a temperature of 650° C. or greater. In an embodiment, the method is characterized by a ratio of $H_2$ produced to CO produced equal to or greater than 90% at a temperature of 650° C. or greater.

In an embodiment, the doped ceria-supported metal catalyst is stable over a reaction time of at least 50 hours. In an embodiment, there is any of the methods above, wherein the doped ceria-supported metal catalyst does not undergo appreciable degradation over a reaction time of at least 50 hours. In an embodiment, the step of contacting the mixed feed stock with a doped ceria-supported metal catalyst is carried out a pressure selected from the range of 0.1 Bar to 2 Bar and a temperature selected from the range of 25° C. to 800° C.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIGS. 1A-1H. Scanning tunneling microscopy images of pure $CeO_2$ (FIG. 1A), Ni nanoparticles deposited on $CeO_2$ (FIG. 1B), Ti-doped $CeO_{1.8}$ (FIG. 1C) as well as Ni dispersed on Ti-doped $CeO_{1.8}$. All catalytic surfaces were annealed to 800 K. Low energy electron diffraction pattern shows the ceria support is ordered exhibiting the (111) plane. Higher resolution image (3×3 $nm^2$) shown as an inset in FIG. 1A resolves the individual Ce atoms on the $CeO_2$(111) surface. FIGS. 1E and 1F. Temperature programmed desorption studies show reaction products collected from Ni/$CeO_{1.8}$ and Ni/Ti—$CeO_{1.8}$ surfaces upon dose of 2 Langmuir ethanol at 300 K with heating to 800 K. C1s XPS peaks collected upon ethanol adsorption over indicated surfaces at 300 K and heating to higher temperatures (FIGS. 1G and 1H).

(FIG. 4E) $H_2$/CO ratios of indicated catalysts in FIGS. 4A-4D and thermodynamic equilibrium data; (FIG. 4F) calculated amounts of $CH_4$, $CO_2$, $H_2$, and CO for 2.4 wt. % Ni/$Ce_{0.7}Ti_{0.3}O_{2-\delta}$. The wt. % value indicated for 2.4 wt. % Ni/$Ce_{0.7}Ti_{0.3}O_{2-\delta}$ was confirmed by Inductively Coupled Plasma (ICP).

(FIG. 5C) the conversions of C02 and $CH_4$ and (FIG. 5D) the yields of CO and $H_2$ of indicated catalysts at 650 and 750° C. in DRM.

STATEMENTS REGARDING CHEMICAL COMPOUNDS AND NOMENCLATURE

Figure 1A:
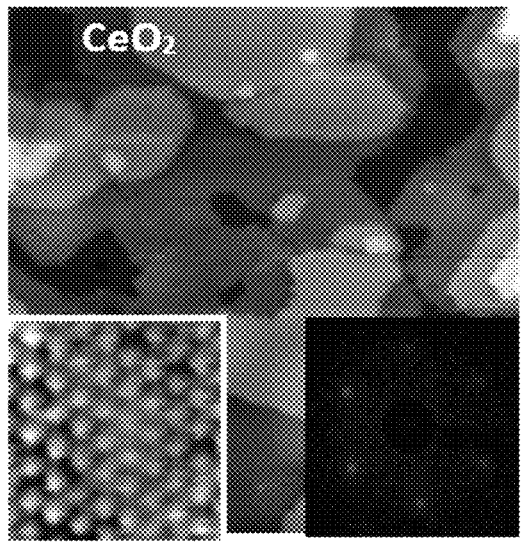

In general, the terms and phrases used herein have their art-recognized meaning, which can be found by reference to standard texts, journal references and contexts known to those skilled in the art. The following definitions are provided to clarify their specific use in the context of the invention.

The expressions "doped ceria-supported metal catalyst" and "metal supported on doped ceria catalysts" are used interchangeably and refer to a material comprising a metal provided on and/or within a doped ceria support. In embodiments, the metal is dispersed over the doped ceria support, for example, provided as particles or clusters on internal and/or external surfaces of the doped ceria support. Metals useful for the present on doped ceria-supported metal catalysts include Ni, Co, Pd, Pt or any mixtures thereof. The doped ceria support includes one or more metal dopants incorporated into the lattice of ceria, optionally including two or more different metals. Dopants useful for the present doped ceria-supported metal catalysts include Ti, Zr, Mn, La and any mixtures thereof. In an embodiment, doped catalyst support maintains the structure of pure ceria and produces mixed metal oxides. Doped ceria-supported metal catalysts may exhibit catalytic activity for processing of a hydrocarbon feed stock, for example, in a DRM process.

The expression "hydrocarbon feed stock" refers to feed stocks for a process, such as a catalytic process, that include at least one hydrocarbon component. Hydrocarbon feed stocks for some embodiments comprise a hydrocarbon component and $CO_2$. Hydrocarbon feed stocks for some embodiments comprise methane and $CO_2$. Hydrocarbon feed stocks for some embodiments comprise methane, $CO_2$, with one or more other hydrocarbons. Hydrocarbon feed stock may be characterized in terms of the ratio of methane to $CO_2$ and or ratio of other hydrocarbons to $CO_2$. When discussing feedstock, applicants note that the source of hydrocarbon can be separate from the source of $CO_2$ feed, for example, to allow ratio to be varied and/or controlled. Components of feedstock, such as $CO_2$ and methane, can be separately introduced into catalytic reactor or added as a mixture. Optionally, $CO_2$ level can be adjusted in a hydrocarbon feed stock, etc. This will depend on feedstock and catalyst. Hydrocarbon feed stocks for some embodiments comprise ethane, propane, or butane. Hydrocarbon feed stocks for some embodiments include natural gas or a derivative thereof. Also feedstock can be from one or more industrial synthesis, production, manufacturing and/or treatment processes including cement processing, steel processing, coal refining, petrochemical refining, crude oil production, natural gas production, coal mining and/or minerals mining. Hydrocarbon feed stocks for some embodiments comprise comprises a product of an industrial process or a combination of products from one or more industrial processes. Hydrocarbon feed stocks for some embodiments comprise an exhaust or byproduct gas, for example, from a coal pyrolysis process; a petrochemical oxidization process; a sintering process; a furnace process; a kiln process; a steam reforming process; an ammonia production process; and any process that produces carbon dioxide. In an embodiment, the hydrocarbon feed stock is obtained or derived from an industrial process that generates both $CO_2$ and methane. In an embodiment, the hydrocarbon feed stock is obtained or derived from an industrial process that generates or emits carbon dioxide, and optionally is in proximity to a source of methane, such as within 100 miles, optionally 50 miles and optionally 20 miles, of each other. In an embodiment, the hydrocarbon feedstock includes $CO_2$ derived from an industrial process involving production, refining, treatment or combustion of a fuel, such as coal, natural gas or oil. Hydrocarbon feed stocks may be treated prior to contact with the present catalysts to remove, add or enrich certain feed stock components. In an embodiment, for example, a hydrocarbon feed stock is treated for removal of sulfur components ($SO_x$), nitrogen components ($NO_x$), water and/or particulate (e.g., carbonaceous particulate such as soot). Often processes of the invention are continuous with feedstock continuously added and product removed, but the present processes also include a batch process.

The symbol "$\delta$" represents oxygen deficiency. In some examples, the numeric value of $\delta$ ranges from greater than 0 to less than 0.5.

The word "nominal" in nominal wt. % refers to the theoretical/anticipated value of the amount of Ni based on a calculation, for example, using parameters from and/or during the materials synthesis. In some embodiments, the wt. % values are examined analytically, such as by ICP analysis, wherein such wt. % values are reported without the word "nominal". The ICP analysis of Ni may be carried out by dissolving the materials in aqua regia at 60° C. followed by the analysis of the Ni amount in the solution and by other techniques generally known in the art.

In an embodiment, a composition or compound of the invention, such as a composite, metal, alloy, metal oxide, precursor or catalyst, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

The demand for energy is continuing to increase due to the rapid rise of the world's population and industrial development. This is coinciding with the use of non-renewable traditional fossil fuels. Therefore it is ideal to find alternative energy sources to fulfill the energy demand of our modern society. Dry reforming of methane (DRM) is one of the potential reactions that utilize two greenhouse gases ($CO_2$ and $CH_4$) to produce industrially important syngas (CO and $H_2$). Syngas is further utilized to produce fertilizer and/or synthetic petroleum as fuels or chemicals. Generally this reaction is carried out at high reaction temperatures in the presence of a heterogeneous catalyst. However, our current global goal for the DRM reaction is to develop thermally stable and active catalysts at reduced reaction temperatures, which can show good resistance to deactivation. Ni (and other metals) dispersed over a range of Ti-doped ceria catalysts were examined in our study and found to be effective and stable for the dry reforming of methane, ethane, and propane.

Technical Description $Ce_{1-x}Ti_xO_{2-\delta}$ supported Ni, Co, and Pd catalysts were synthesized with Ti concentrations (including x=0.1, 0.2, 0.3, 0.4 and 0.5) with controlled metal loadings between 1 and 10 wt % by a sol-gel technique and characterized with x-ray diffractions, scanning electron microscopy-energy dispersive spectroscopy, BET surface area, inductively coupled plasma (ICP), and hydrogen chemisorption. X-ray diffraction shows the formation of $Ce_{1-x}Ti_xO_{2-\delta}$ solid materials for selected Ce:Ti composition ratios. Ceria exhibits unique redox properties and oxygen storage capacities, which can better anchor Ni as small clusters and inhibit coke formation. Introduction of metal dopant, Ti, into ceria could promote its redox properties as well as enhance its thermal stability at high temperatures.

Nanoparticles of Ni (or Co and Pd) are properly dispersed over the $Ce_{1-x}Ti_xO_{2-\delta}$ support surface. The catalytic DRM performance was investigated in a continuous gas flow reactor using gas chromatography and mass spectrometry instruments and compared with respect to reaction temperatures, Ce:Ti ratios in the oxide supports, and Ni loadings. XPS and XRD data show the formation of $Ce_{1-x}Ti_xO_{2-\delta}$ solid mixed oxide supports. Reactivity was examined with respect to key factors such as: Ce:Ti ratio, reaction temperature, metal (Ni, Co, or Pd), metal loading, reactant composition, and alkane (methane, ethane, propane). This work demonstrates the DRM activity depends on the Ce:Ti composition in the support and the metal loading of the Ni. The 2±0.3 wt % Ni supported on $Ce_{1-x}Ti_xO_{2-\delta}$ catalyst shows the remarkable $CH_4$ conversion and hydrogen yield at temperatures as low as 600° C. Additionally the catalysts exhibit little activity loss over a 50 hour reaction period compared to other supports. The support also minimizes activity loss for other metals (Co and Pd) and for other feed stocks (ethane and propane).

The 2 wt. % $Ni/Ce_{0.7}Ti_{0.3}O_{2-\delta}$ catalyst was identified to deliver the good catalytic activity and stability among all the ceria supports and Ni loadings examined. At 650° C., the 2 wt. % Ni over $Ce_{0.7}Ti_{0.3}O_{2-\delta}$ catalyst shows good conversions of 73% and 79% for $CH_4$ and $CO_2$, respectively. The product yields were 42% and 52% for $H_2$ and CO. Additionally, compared to other metals including Pd and Co, the Ni catalyst delivers a higher reactivity and a long-term stability (up to 50 h) during the DRM reaction on stream. The enhanced reactivity and stability of this catalyst can be attributed to the unique interaction between the Ni metal and $Ce_{0.7}Ti_{0.3}O_{2-\delta}$ support, the high BET surface area (26 $m^2$ $g^{-1}$) and metal active sites.

This example demonstrates the DRM activity depends on the Ce:Ti composition in the support and the metal loading of the Ni. The 2 wt % Ni supported on $Ce_{1-x}Ti_xO_{2-\delta}$ catalyst shows the remarkable $CH_4$ conversion and hydrogen yield at temperatures as low as 600° C. Additionally the catalyst exhibits little activity loss over a 50 hour reaction period compared to other supports. The support also minimizes activity loss for other metals (Co and Pd) and for other feedstocks (ethane and propane). Overall this study of the catalyst with three metals (Ni, Co, and Pd) and multiple feedstocks (methane, ethane, and propane) over a series of $Ce_{1-x}Ti_xO_{2-\delta}$ supports indicates an active and stable catalyst for dry reforming and have significant applicability for a range of industrial applications. Prior to the DRM activity test, all catalysts were reduced in $H_2$ with a flow rate of 20 mL min-1 for one hour.

Dry reforming of methane was carried out in a fixed-bed continuous flow reactor which is made up of a quartz glass with an internal diameter of 0.25 inch and a length of 24 inches. The catalyst amount of 200 mg was used. Flow rates of 12.5 mL $min^{-1}$ of methane and 12.5 mL $min^{-1}$ of carbon dioxide were used for the dry reforming of methane reaction, yielding a total flow rate of 25 mL $min^{-1}$ for the mixture. GHSV of 5098 $h^{-1}$ is determined based on the catalyst bed volume of 0.294 $cm^3$. Catalytic tests were performed at temperatures ranging from 25 to 800° C. with a 30-minute reaction duration. Flow rates of 8.3 mL $min^{-1}$ of ethane and 16.7 mL $min^{-1}$ of carbon dioxide were used for the dry reforming of ethane reaction, yielding a total flow rate of 25 mL $min^{-1}$ for the mixture. The catalyst amount of 300 mg was used. Flow rates of 5 mL $min^{-1}$ of propane and 20 mL $min^{-1}$ of carbon dioxide were used for the dry reforming of propane reaction, yielding a total flow rate of 25 mL $min^{-1}$ for the mixture. The catalyst amount of 200-300 mg was used.

Advantages: (1) The present catalysts and processes activate the DRM reaction between 300 and 350° C., for example, working at lower reaction temperature (600° C.). (2) The present catalysts and processes provide an outstanding $CH_4$ conversion of 73% at 650° C. and close to 100% $CH_4$ conversion at 800° C. with primarily CO and $H_2$ products. (3) The present catalysts are stable for a 50 hour reaction run. (4) The catalysts are also effective at dry reforming of ethane and propane. (5) The $Ce_{1-x}Ti_xO_{2-\delta}$ support is capable of minimizing catalyst deactivation for Ni, Co, and Pd. Reactant conversions and product yields for dry reforming have been enhanced.

The invention can be further understood by the following non-limiting examples.

Example 1: Multi-Functional Ceria-Supported Ni Catalysts for Dry Reforming of Methane This Example relates to ceria promoted Ni catalysts for application in dry reforming of methane (DRM) to produce syngas ($CO/H_2$) for industrial applications, to produce hydrogen as energy fuels, and contribute to a reduction in $CO_2$ emissions. Ni is active towards $CH_4$ activation in DRM. However, it can deactivate easily due to thermal agglomeration and coke formation. Unique redox properties and oxygen storage capacities of ceria can promote the stability of Ni. Furthermore, doping ceria with other metal elements (e.g. Ti, Zr, Mn and La) not only can enhance its thermal stability at high temperatures, but also cause structural and electronic modifications resulting in enhanced redox properties. This example provides a fundamental mechanistic understanding of the effect of the dopants (e.g. Ti, Zr, Mn, La) in ceria on the DRM chemistry of Ni. Metal-doped ceria supports are described having controlled structures and compositions for Ni catalysts, along with characterization of their morphology, size, electronic and chemical properties. Advanced techniques may be used to probe various aspects of the catalytic surfaces to establish the interplay between the Ni and ceria support and its effect toward the performance of Ni in the DRM reaction.

Interest in DRM catalysts and processes is driven by the potential conversion of methane with $CO_2$ to produce fuels and value-added chemicals for the global energy challenge. This work contributes to the long-term goal facing the DRM catalysis that requires the development of economical, efficient and stable multi-functional catalysts. Detailed structure-reactivity mechanistic understanding of ceria promoted Ni catalysts also provides significant insights in the use of Ni-based materials in many other industrial applications. The work establishes new catalyst systems and to obtain data necessary for assessing the scalability and economics of using these catalysts in a hydrogen production facility.

Statement of the problem: The present example focuses on an emerging reaction for the conversion of natural gas to chemical fuels through the dry reforming of methane (DRM). DRM utilizes two abundantly available green-house gases to produce industrially important syngas ($CH_4$+ $CO_2 \rightarrow 2CO+2H_2$; $\Delta H_{298\,K}$=+247 kJ/mol).[1] There is a growing interest in reacting these two molecules as an efficient way to produce syngas (CO and $H_2$). While DRM is endothermic, its main competition for producing syngas, steam reforming of methane is also +205 kJ/mol exothermic.[1] Since there are extensive proven reserves of natural gas in the United States, methane is likely to remain abundantly available. A study has also indicated that DRM has a 20% lower operating cost compared to other reforming processes.[2] Syngas can be further used to produce synthetic petroleum as fuels or chemicals. DRM also serves as an important prototype reaction for sustainable chemical recycling and conversion by utilizing a major atmospheric pollutant $CO_2$.[3-6]

DRM involves activation of C—H and C—O bonds followed by subsequent reaction to produce CO and $H_2$. Metals dispersed on oxides have been used as DRM catalysts.[1,7-16] The overall activity depends on the type of the active metal, the nature of the support, and the interaction between the metal and support. It is commonly accepted that the reaction mechanism is bifunctional. Methane and $CO_2$ activate on the metal and support, respectively. The interface between the metal and the metal oxide provides sites to complete the reaction. Supported noble metals including Pt, Rh, and Ru are highly active toward the DRM reaction at high temperatures and more resistant to carbon formation than other transition metals.[8,10,14] However, they are expensive for practical applications. Ni has also been studied as cheaper and more abundant alternatives.[9,11,13,16,17] $CH_4$ can be activated on Ni and undergo thermal decomposition to form $H_2$ and carbon/$CH_x$/formyl intermediates. Deposited C species can block surface sites on Ni for further reaction. Furthermore, Ni is subjective to sintering which also causes rapid deactivation during reforming reactions.[18,19] Therefore, a current global challenge for the DRM reaction is to develop thermally stable and active catalysts which can show good resistance to deactivation.

Objectives and approach: This example demonstrates metal-doped ceria as catalytic supports for Ni to address the $CO_2$ activation as well as the coke issues related with Ni catalysts. One method to suppress coking is to use the oxide support as an oxygen reservoir. Ceria supports provide a solution to improve the stability and catalytic performance of metal catalysts.[20-41] Studies have indicated that the catalytic reactivity of ceria-supported metal nanoparticles can be influenced by the redox properties of ceria as well as the synergistic effect between the two.[23,24] Dispersing metals as nanoparticles on ceria can provide a way to diminish the coke formation. The unique performance of ceria-based catalytic systems have also been related with the ability of ceria to readily transfer its oxidation states between $Ce^{4+}$ and $Ce^{3+}$, which facilitates the oxygen release and storage during catalytic reactions.[25,29,30] Due to unique redox properties and oxygen storage capacity, ceria can act as the active phase to remove C deposit on the metal by oxidation of surface carbon as CO and thus prevent the metal deactivation. The existence of a strong metal-support interaction between metal and ceria may modify the structure and electronic properties of active metals to improve the performance of metal-ceria systems.[27,41]

Metal-doped ceria in some instances provides a better catalytic support for metal catalysts for practical applications compared to pure ceria. One main issue regarding the use of pure ceria as real-world catalytic supports is its poor thermal stability at high temperatures.[42,43] It can undergo sintering which causes the loss of its crucial oxygen storage capacity. Not only can doping of ceria with metal elements enhance its thermal stability, but also improve its redox properties and oxygen storage capacity.[44-57] The addition of different metal dopants into ceria ideally replaces the Ce cation lattice sites and forms a solid solution of a mixed oxide ($Ce_{1-x}M_xO_{2-\delta}$; M: metal dopant; 0<x<0.5). Due to the size difference between the Ce and the dopant, the doped ceria has non-equivalent metal-oxygen bond distances, and thus a change in its unit cell size, which can weaken the Ce—O and dopant-O bonds resulting in the reduction in the formation energy of oxygen vacancies and promotion of the redox characteristics of ceria.[47,48,58] In addition to structural changes, the dopant also introduces electronic modifications of ceria, facilitates the formation of O vacancies on the surface, and increases its redox properties.[50,59] The enhanced redox properties of doped ceria, due to the structural and electronic modifications by metal dopants, could lead to superior catalytic activity or selectivity of supported metal nanocatalysts.[61-70]

Figure 1B:
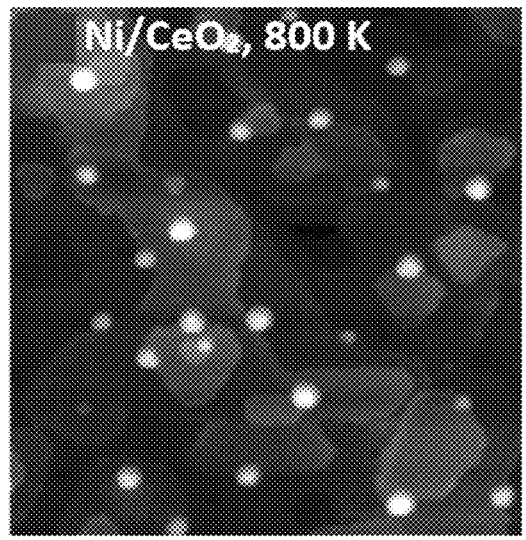
Figure 1C:
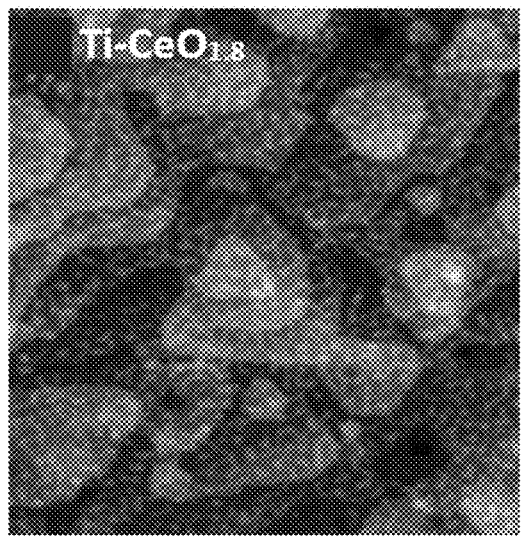
Figure 1D:
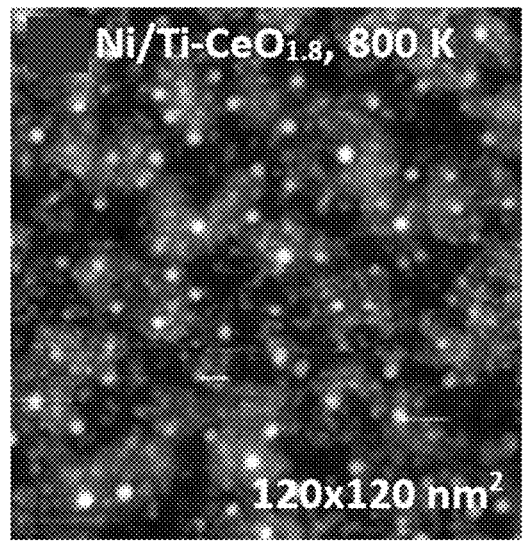

A catalyst composed of Ni particles dispersed on model Ti-doped $CeO_x$(111) surfaces (1.5<x<2) is highly active and stable for ethanol adsorption to produce $H_2$.[22,71-73] Well-ordered $CeO_x$(111) thin films of 2 nm thick grown on Ru(0001) substrate show flat terraces separated by monoatomic steps (FIG. 1A). Doping ceria with Ti can form Ti—O—Ce hetero-structures shown as chain structures on the $CeO_x$ surface (FIG. 1C). Ni forms three-dimensional particles after heating to 800 K shown as bright protrusions in FIG. 1B. Titania chains on ceria provide the nucleation sites for Ni and greatly inhibit its agglomeration upon heating with significantly smaller Ni particles (FIG. 1D). Modified structural and electronic properties of ceria by Ti can further lead to enhanced reforming activity of deposited Ni nanoparticles. Ethanol can undergo dehydration and dehydrogenation processes to form $C_2H_4$, $CH_3CHO$ and small amounts of $H_2O$ and $H_2$ over ceria support itself as shown in the temperature programmed desorption (TPD) results. Ni is reactive toward ethanol and reaction of ethanol on Ni particles on ceria gives out CO and $H_2$ between 300 and 450 K. Ethanol reaction at the Ni-ceria interface produces CO and $H_2$ at 580 K (FIG. 1E). Unique redox properties of ceria can assist the removal of C deposits as CO gas from Ni as indicated with a desorption peak at 700 K. Partial substitution of Ce with Ti in the $CeO_2$(111) support provide unique sites for the promotion of Ni reactivity for the ethanol reaction (FIG. 1F). Ni is subject to coke formation during reforming processes. It is very promising, however, that removal of carbon deposits from Ni using a Ti-ceria is supported in the X-ray photoelectron spectroscopy (XPS) study of ethanol adsorption (FIGS. 1G and 1H). As a comparison, without Ti dopant in ceria, atomic-like C species persists on Ni even after heating to 700 K.

Figure 2A:
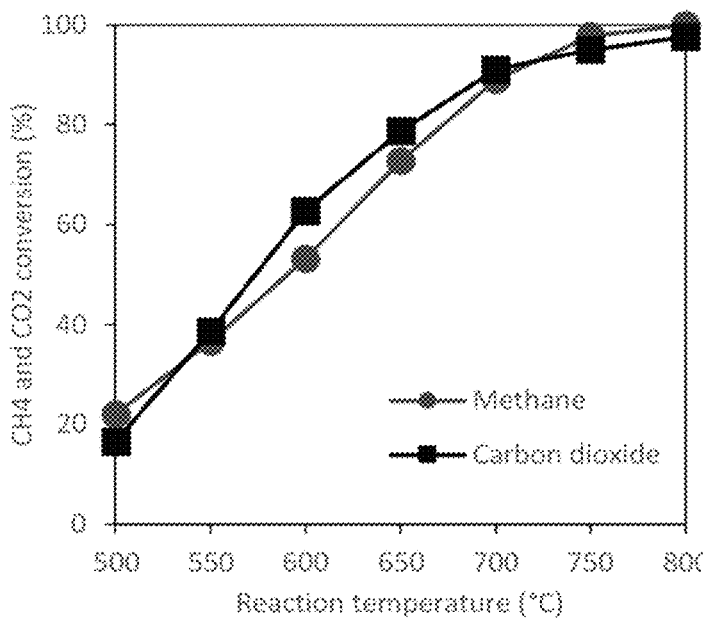
FIG. 2A. $CH_4$ and $CO_2$ conversions and CO and $H_2$ yields for 2 wt. % Ni/$Ce_{0.7}Ti_{0.3}O_{2-\delta}$ for dry reforming of methane reaction based on the gas chromatography analysis.
Figure 2B:
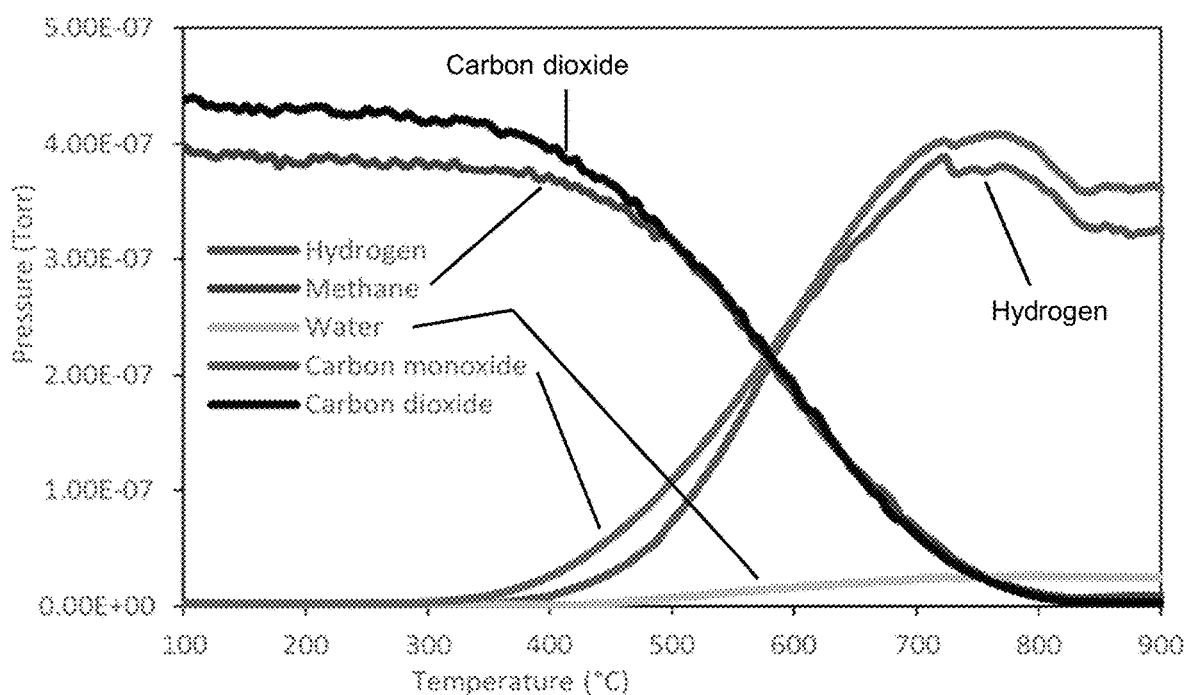
FIG. 2B. Partial pressure values of $CH_4$, $CO_2$, CO and $H_2$ monitored by a mass spectrometer during the DRM reaction with a temperature range between 100 and 800° C. over 2 wt. % Ni/$Ce_{0.7}Ti_{0.3}O_{2-\delta}$.
Figure 2C:
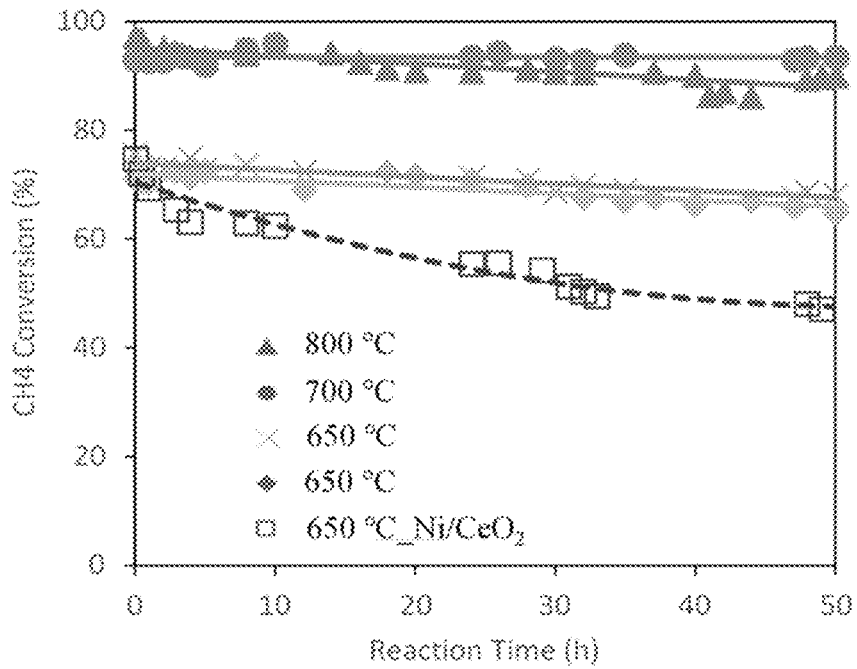
FIG. 2C. The DRM stability test for 2 wt. % Ni/$Ce_{0.7}Ti_{0.3}O_{2-\delta}$ at indicated temperatures.
Figure 2D:
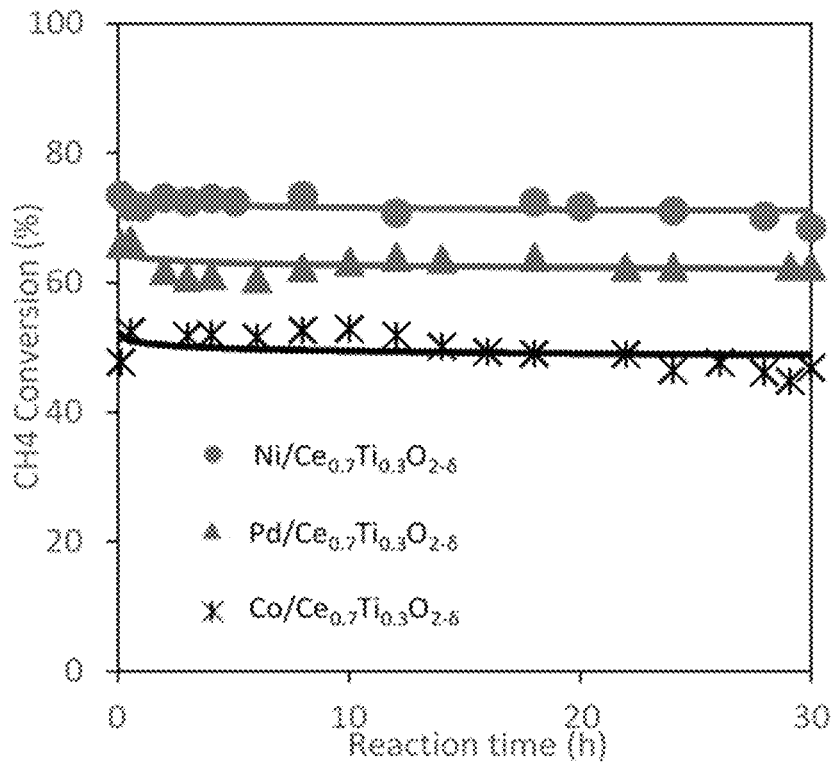
FIG. 2D. Comparison results for the DRM stability test for Ni, Pd and Co.

Knowledge from model catalysts of Ni/Ti-doped $CeO_x$(111) studied under ultrahigh vacuum condition (pressure less than $1\times10^{-10}$ Torr) may provide insights into real-world catalysts under reactor conditions (1 mtorr-100 Torr). We prepared practical Ni particles dispersed on $Ce_{1-x}Ti_xO_{2-\delta}$ (x: 0.1, 0.2, 0.3, and 0.5) using sol-gel methods for the DRM reaction. The amount of Ti was be varied to better tune the structure and redox properties of ceria. Loadings of nickel from 0.5-10 wt %) on ceria supports were also be varied for the comparison of the DRM activity. It is successfully demonstrated that 2 wt. % Ni supported over $Ce_{0.7}Ti_{0.3}O_{2-\delta}$ is an active and stable DRM catalyst using laboratory-based reactors and GC/MS instruments. The catalyst delivers an outstanding $CH_4$ conversion of 73% at 650° C. and close to 100% $CH_4$ conversion at 800° C. with primarily CO and $H_2$ products (FIGS. 2A and 2B). The issue of coke formation and the deactivation and long-term stability behavior may be studied over 2 wt. % Ni/Ce$_{0.7}$Ti$_{0.3}$O$_{2-\delta}$. The results support an understanding that the present catalysts maintain their activity during the time on stream for 50 hours at three temperatures of interest (FIG. 2C). The Ce$_{0.7}$Ti$_{0.3}$O$_{2-\delta}$ support can greatly promote the stability of the Ni catalyst compared to other oxide supports (e.g. CeO$_2$, FIG. 2C). Other metal catalysts including Pd and Co are also promising. For example, 2 wt. % Ni/Ce$_{0.7}$Ti$_{0.3}$O$_{2-\delta}$ shows the best catalytic reactivity (FIG. 2D). The Ce$_{0.7}$Ti$_{0.3}$O$_{2-\delta}$ support also minimizes the activity loss for all three metals (Ni, Pd, and Co).

In this example, metal dopants for the catalyst are selected, in addition to Ti, including Zr, Mn, and La,[49,54,56,74,75] which provide a measure to tune redox properties and oxygen storage capacity of ceria supports and elucidate the promotional effect of the chemistry for Ni in the DRM reaction. This approach allows for a better understanding elemental steps of the reaction including 1) methane activation, 2) CO$_2$ activation, 3) reaction to form syngas, as well as the issue of coking formation.

The structure at the catalytic interface is central to the chemical processes. The prepared Ni/Ce-M-O catalysts may be characterized using appropriate physical-chemical techniques. Nitrogen physisorption may be used to measure surface area, CO physisorption followed by TPD to identify variations among surface sites and temperature programmed reduction (TPR) in hydrogen to evaluate the reducibility of both the metal clusters and the support. XPS may be used to examine the surface elements present and their chemical states. Scanning electron microscopy with energy dispersion spectroscopy and X-ray diffraction may be used to measure the metal cluster size and crystal structure. To understanding of the stability of the materials under high temperatures, reducing and reaction conditions, all the prepared catalysts are annealed in vacuum and H$_2$ environment to various temperatures. The subsequent changes in their structural and electronic properties may be investigated.

To understand the chemistry over Ni/Ce-M-O catalysts, the DRM reaction may be first studied on pure ceria and Ti-doped ceria supports. Various spectroscopic methods may be used to elucidate the proposed reaction mechanism. The reaction products and their yields may be monitored with a mass spectrometer. Each of the catalysts may be tested kinetically in a flow reactor to measure specific reaction rates (per metal atom, per exposed metal atom, per surface area, and/or per mass). Reaction temperatures may also be varied to determine relevant kinetic parameters of activation energy and ignition temperature for each catalyst. Infrared spectroscopy may be used to probe the surface intermediates formed during the reaction since CO, CH$_3$ and carbonate have signature IR bands. XPS may be used to check the carbon deposits if formed on Ni upon methane adsorption by monitoring the C1s region. One possibility is that metal-doped ceria may act as the active phase to remove C deposit from Ni by oxidation of surface carbon with lattice O in ceria as CO. Ceria may be regenerated by taking O from CO$_2$ activation. Redox properties of ceria may be probed by monitoring Ce 3d, O 1s and C 1s XPS regions during the reaction. Using the above integrated techniques will provide a better understanding of the DRM reaction mechanism over Ni/Ce-M-O materials in unprecedented detail and allow the catalyst with specific composition/structure for the optimum performance to be identified.

Catalyst Synthesis: The synthesis of catalysts may involve two steps: mixed-oxide support synthesis and nickel deposition synthesis. The mixed-oxides may be produced by sol-gel (or similar techniques). These support materials are then calcined to remove the chemical precursors used to produce the support material. Next, the nickel is deposited using a wet impregnation (or other similar technique). The samples are then calcined and reduced to produce the Ni metal particles on the support.

Catalyst Characterization: Catalyst characterization may occur in two phases. Characterization of the fresh, as-made catalysts. This may include such techniques as TEM, XPS, and powder XRD. This will provide information on the initial state of the catalytic materials. Characterization may also occur on the used catalysts, again including such techniques as above. This will provide information on the "after" state of the catalysts including information on crystal structure change, particle sintering, and carbon formation.

Reactivity Studies: Reactivity studies are useful to investigate activity and selectivity of the catalyst under short term conditions. This will allow correlation of initial catalyst properties with activity. In addition, long-term (e.g. 50 to 500 hours) stability testing (possibly also including S contaminants) is beneficial.

Results and Impacts Ce—Ti-Ox catalysts exhibit dramatically improved stability (minimize deactivation) of Ni supported catalysts for dry reforming of methane. This work clearly demonstrates the ability of the Ti substitution into the ceria lattice to improve stability. Three additional ceria dopants are also options to affect catalyst reactivity/selectivity: Zr, Mn, and La. These three dopants offer the ability to modify the structural and electronic properties of the ceria in different ways that Ti can. The variation in size (Ti=1.32 Å, Zr=1.45, Mn=1.17, and La=1.69) and electronegativity (Ti=1.54, Zr=1.33, Mn=1.55, and La=1.10) offer the ability to modify both the structural and electronic properties of the ceria in a systematic manner.

Additionally, fine tuning the amount of dopant added and the amount of Ni required as well as temperature and partial pressure effects may be used to enhance the overall reactivity and selectivity. The present approach may also be applicable for re-activating or regenerating the catalysts. Additional forms of ceria mixed-oxides may provide improved stability for dry reforming of methane catalysts.

Earth abundant metals (Ni) are useful for catalysts for dry reforming of methane and CO$_2$ to synthesis gas. These catalysts are susceptible to deactivation due to solid carbon buildup on the catalysts surface which leads to blocking of active sites. Examining catalyst reactivity and stability as a function of the support material (ceria with other metals incorporated to form mixed-metal oxides) provides a powerful tool for understanding DRM processes and identifying candidate catalyst materials. To correlate reactivity with catalyst material, advanced characterization techniques such as TEM, STEM, and SEM to examine catalyst structure (of both the Ni and mixed-metal oxide) both before and after the reaction are useful to provide information on particle size, shape, and morphology. Post-reaction examination also provides information on the quantity and state of any deposited carbon. In particular, to monitor catalyst deactivation the X-ray photoelectron spectroscopy instrument with reaction chamber is a valuable technique.

To properly investigate these dry reforming catalysts, short-term and long-term studies are useful. Short-term studies provide information on catalyst reactivity and selectivity, while long-term studies provide information on catalyst deactivation/stability. Finally, many methane streams have small amounts of sulfur contamination in them. It is desirable to develop sulfur tolerant catalysts instead of inserting processes that would remove the sulfur. Thus, reactivity testing with feed stock having sulfur contaminants may be useful for both short-term activity/selectivity studies and long-term deactivation/stability testing.

REFERENCES

1. Pakhare, D., Spivey, J., A Review of Dry ($CO_2$) Reforming of Methane over Noble Metal Catalysts. Chemical Society Reviews, 2014, 43, (22), 7813-7837.
2. Ross, J. R. H., Natural Gas Reforming and $CO_2$ Mitigation. Catalysis Today, 2005, 100, (1-2), 151-158.
3. Aresta, M., Dibenedetto, A., Utilisation of $CO_2$ as a Chemical Feedstock: Opportunities and Challenges. Dalton Transactions, 2007, (28), 2975-2992.
4. Centi, G., Iaquaniello, G., Perathoner, S., Can We Afford to Waste Carbon Dioxide? Carbon Dioxide as a Valuable Source of Carbon for the Production of Light Olefins. ChemSusChem, 2011, 4, (9), 1265-1273.
5. Centi, G., Quadrelli, E. A., Perathoner, S., Catalysis for $CO_2$ Conversion: a Key Technology for Rapid Introduction of Renewable Energy in the Value Chain of Chemical Industries. Energy & Environmental Science, 2013, 6, (6), 1711-1731.
6. Dorner, R. W., Hardy, D. R., Williams, F. W., Willauer, H. D., Heterogeneous Catalytic $CO_2$ Conversion to Value-Added Hydrocarbons. Energy & Environmental, Science 2010, 3, (7), 884-890.
7. Cargnello, M., Jaen, J. J. D., Garrido, J. C. H., Bakhmutsky, K., Montini, T., Gamez, J. J. C., Gorte, R. J., Fornasiero, P., Exceptional Activity for Methane Combustion over Modular Pd@$CeO_2$ Subunits on Functionalized $Al_2O_3$. Science, 2012, 337, (6095), 713-717.
8. Kehres, J., Jakobsen, J. G., Andreasen, J. W., Wagner, J. B., Liu, H. H., Molenbroek, A., Sehested, J., Chorkendorff, I., Vegge, T., Dynamical Properties of a Ru/$MgAl_2O_4$ Catalyst during Reduction and Dry Methane Reforming. Journal of Physical Chemistry C, 2012, 116, (40), 21407-21415.
9. Liu, Z. Y., Grinter, D. C., Lustemberg, P. G., Nguyen-Phan, T. D., Zhou, Y. H., Luo, S., Waluyo, I., Crumlin, E. J., Stacchiola, D. J., Zhou, J., Carrasco, J., Busnengo, H. F., Ganduglia-Pirovano, M. V., Senanayake, S. D., Rodriguez, J. A., Dry Reforming of Methane on a Highly-Active Ni—$CeO_2$ Catalyst: Effects of Metal-Support Interactions on C—H Bond Breaking. Angewandte Chemie International Edition, 2016, 55, (26), 7455-7459.
10. AI-Doghachi, F. A. J., Rashid, U., Zainal, Z., Saiman, M. I., Yap, Y. H. T., Influence of $Ce_2O_3$ and $CeO_2$ Promoters on Pd/MgO Catalysts in the Dry-Reforming of Methane. Rsc Advances, 2015, 5, (99), 81739-81752.
11. Zhang, G. J., Liu, J. W., Xu, Y., Sun, Y. H., A Review of $CH_4$—$CO_2$ Reforming to Synthesis Gas over Ni-Based Catalysts in Recent Years (2010-2017). International Journal of Hydrogen Energy, 2018, 43, (32), 15030-15054.
12. Kawi, S., Kathiraser, Y., $CO_2$ as an Oxidant for High-Temperature Reactions. Frontiers in Energy Research, 2015, 3, 13-17.
13. Li, S. R., Gong, J. L., Strategies for Improving the Performance and Stability of Ni-Based Catalysts for Reforming Reactions. Chemical Society Reviews, 2014, 43, (21), 7245-7256.
14. Wei, J., Iglesia, E., Mechanism and Site Requirements for Activation and Chemical Conversion of Methane on Supported Pt Clusters and Turnover Rate Comparisons among Noble Metals. Journal of Physical Chemistry B, 2004, 108, (13), 4094-4103.
15. Wei, J., Iglesia, E., Isotopic and Kinetic Assessment of the Mechanism of Reactions of $CH_4$ with $CO_2$ or $H_2O$ to Form Synthesis Gas and Carbon on Nickel Catalysts. Journal of Catalysis, 2004, 224, (2), 370-383.
16. Yao, Y. X., Goodman, W., In situ IR Spectroscopic Studies of Ni Surface Segregation Induced by CO Adsorption on Cu—Ni/$SiO_2$ Bimetallic Catalysts. Physical Chemistry Chemical Physics, 2014, 16, (8), 3823-3829.
17. De, S., Zhang, J. G., Luque, R., Yan, N., Ni-based Bimetallic Heterogeneous Catalysts for Energy and Environmental Applications. Energy & Environmental Science, 2016, 9, (11), 3314-3347.
18. Ni, M.; Leung, D. Y. C.; Leung, M. K. H., A Review on Reforming Bio-ethanol for Hydrogen Production. International Journal of Hydrogen Energy 2007, 32, (15), 3238-3247.
19. Xu, J. Z.; Zhang, X. P.; Zenobi, R.; Yoshinobu, J.; Xu, Z.; Yates, J. T., Ethanol Decomposition on Ni(111)— Observation of Ethoxy Formation by IRAS and Other Methods. Surface Science 1991, 256, (3), 288-300.
20. Zhou, J.; Baddorf, A. P.; Mullins, D. R.; Overbury, S. H., Growth and Characterization of Rh and Pd Nanoparticles on Oxidized and Reduced $CeO_x$(111) Thin Films by Scanning Tunneling Microscopy. Journal of Physical Chemistry C 2008, 112, (25), 9336-9345.
21. Zhou, Y.; Zhou, J., Growth and Sintering of Au—Pt Nanoparticles on Oxidized and Reduced $CeO_x$(111) Thin Films by Scanning Tunneling Microscopy. Journal of Physical Chemistry Letter 2010, 1, (3), 609-615.
22. Zhou, Y. H.; Perket, J. M.; Crooks, A. B.; Zhou, J., Effect of Ceria Support on the Structure of Ni Nanoparticles. Journal of Physical Chemistry Letters 2010, 1, (9), 1447-1453.
23. Trovarelli, A., Catalysis by Ceria and Related Materials. Imperial College Press: London, 2002, 2, 510-512.
24. Trovarelli, A.; de Leitenburg, C.; Boaro, M.; Dolcetti, G., The Utilization of Ceria in Industrial Catalysis. Catalysis Today 1999, 50, (2), 353-367.
25. Bunluesin, T.; Gorte, R. J.; Graham, G. W., Studies of the Water-Gas-Shift Reaction on Ceria-supported Pt, Pd, and Rh: Implications for Oxygen-storage Properties. Applied Catalysis B: Environmental 1998, 15, (1-2), 107-114.
26. Ayastuy, J. L.; Gil-Rodriguez, A.; Gonzalez-Marcos, M. P.; Gutierrez-Ortiz, M. A., Effect of Process Variables on Pt/$CeO_2$ Catalyst Behaviour for the PROX Reaction. International Journal of Hydrogen Energy 2006, 31, (15), 2231-2242.
27. Fu, Q.; Saltsburg, H.; Flytzani-Stephanopoulos, M., Active Nonmetallic Au and Pt Species on Ceria-based Water-Gas Shift Catalysts. Science 2003, 301, (5635), 935-938.
28. Liu, P.; Rodriguez, J. A., Water-gas-shift Reaction on Metal Nanoparticles and Surfaces. Journal of Chemical Physics 2007, 126, (16), 164705.
29. Rodriguez, J. A.; Wang, X.; Liu, P.; Wen, W.; Hanson, J. C.; Hrbek, J.; Perez, M.; Evans, J., Gold Nanoparticles on Ceria: Importance of O Vacancies in the Activation of Gold. Topics in Catalysis 2007, 44, (1-2), 73-81.
30. Wang, X.; Rodriguez, J. A.; Hanson, J. C.; Perez, M.; Evans, J., In situ Time-Resolved Characterization of Au—$CeO_2$ and $AuO_x$—$CeO_2$ Catalysts during the Water-Gas Shift Reaction: Presence of Au and O Vacancies in the Active Phase. Journal of Chemical Physics 2005, 123, (22), 221101.

31. Stubenrauch, J.; Vohs, J. M., Support Effects in the Dissociation of CO on Rh/CeO$_2$(111). Catalysis Letters 1997, 47, (1), 21-25.
32. Weststrate, C. J.; Resta, A.; Westerstrom, R.; Lundgren, E.; Mikkelsen, A.; Andersen, J. N., CO Adsorption on a Au/CeO$_2$(111) Model Catalyst. Journal of Physical Chemistry C 2008, 112, (17), 6900-6906.
33. Weststrate, C. J.; Westerstrom, R.; Lundgren, E.; Mikkelsen, A.; Andersen, J. N., Influence of Oxygen Vacancies on the Properties of Ceria-Supported Gold. Journal of Physical Chemistry C 2009, 113, (2), 724-728.
34. Kundakovic, L.; Mullins, D. R.; Overbury, S. H., Adsorption and reaction of H$_2$O and CO on oxidized and reduced Rh/CeO$_x$(111) surfaces. Surface Science 2000, 457, (1-2), 51-62.
35. Mullins, D. R.; Zhang, K. Z., Metal-support Interactions between Pt and Thin Film Cerium Oxide. Surface Science 2002, 513, (1), 163-173.
36. Andreeva, D.; Ivanov, I.; Ilieva, L.; Sobczak, J. W.; Avdeev, G.; Petrov, K., Gold based catalysts on ceria and ceria-alumina for WGS reaction (WGS Gold catalysts). Topics in Catalysis 2007, 44, (1-2), 173-182.
37. Lu, J. L.; Gao, H. J.; Shaikhutdinov, S.; Freund, H. J., Gold Supported on Well-Ordered Ceria Films: Nucleation, Growth and Morphology in CO Oxidation Reaction. Catalysis letter 2007, 114, (1-2), 8-16.
38. Baron, M.; Bondarchuk, O.; Stacchiola, D.; Shaikhutdinov, S.; Freund, H. J., Interaction of Gold with Cerium Oxide Supports: CeO$_2$(111) Thin Films vs CeO$_x$ Nanoparticles. Journal of Physical Chemistry C 2009, 113, (15), 6042-6049.
39. Henderson, M. A.; Perkins, C. L.; Engelhard, M. H.; Thevuthasan, S.; Peden, C. H. F., Redox Properties of Water on the Oxidized and Reduced Surfaces of CeO$_2$ (111). Surface Science 2003, 526, (1-2), 1-18.
40. Park, J. B.; Graciani, J.; Evans, J.; Stacchiola, D.; Senanayake, S. D.; Barrio, L.; Liu, P.; Sanz, J. F.; Hrbek, J.; Rodriguez, J. A., Gold, Copper, and Platinum Nanoparticles Dispersed on CeO$_x$/TiO$_2$(110) Surfaces: High Water-Gas Shift Activity and the Nature of the Mixed-Metal Oxide at the Nanometer Level. Journal of the American Chemical Society 2010, 132, (1), 356-363.
41. Rodriguez, J. A.; Graciani, J.; Evans, J.; Park, J. B.; Yang, F.; Stacchiola, D.; Senanayake, S. D.; Ma, S. G.; Perez, M.; Liu, P.; Sanz, J. F.; Hrbek, J., Water-Gas Shift Reaction on a Highly Active Inverse CeO$_x$/Cu(111) Catalyst: Unique Role of Ceria Nanoparticles. Angewandte Chemie-International Edition 2009, 48, (43), 8047-8050.
42. Wang, X.; Gorte, R. J.; Wagner, J. P., Deactivation Mechanisms for Pd/Ceria during the Water-Gas-Shift Reaction. Journal of Catalysis 2002, 212, (2), 225-230.
43. Karpenko, A.; Leppelt, R.; Cai, J.; Plzak, V.; Chuvilin, A.; Kaiser, U.; Behm, R. J., Deactivation of a Au/CeO$_2$ Catalyst during the Low-Temperature Water-Gas Shift Reaction and Its Reactivation: A Combined TEM, XRD, XPS, DRIFTS, and Activity Study. Journal of Catalysis 2007, 250, (1), 139-150.
44. Rao, G. R.; Kaspar, J.; Meriani, S.; Dimonte, R.; Graziani, M., NO Decomposition over Partially Reduced Metallized CeO$_2$—ZrO$_2$ Solid-Solutions. Catalysis letter 1994, 24, (1-2), 107-112.
45. Di Monte, R.; Kaspar, J., Nanostructured CeO$_2$—ZrO$_2$ Mixed Oxides. Journal of Materials Research 2005, 15, (6), 633-648.
46. Rynkowski, J.; Farbotko, J.; Touroude, R.; Hilaire, L., Redox Behaviour of Ceria-Titania Mixed Oxides. Applied Catalysis A-Gen. 2000, 203, (2), 335-348.
47. Rodriguez, J. A.; Wang, X.; Liu, G.; Hansona, J. C.; Hrbek, J.; Peden, C. H. F.; Iglesias-Juez, A.; Fernandez-Garcia, M., Physical and Chemical Properties of Ce$_{1-x}$Zr$_x$O$_2$ Nanoparticles and Ce$_{1-x}$Zr$_x$O$_2$(111) Surfaces: Synchrotron-based Studies. Journal of Molecular Catalysis A: Chemical 2005, 228, (1-2), 11-19.
48. Rodriguez, J. A.; Hanson, J. C.; Kim, J. Y.; Liu, G.; Iglesias-Juez, A.; Fernandez-Garcia, M., Properties of CeO$_2$ and Ce$_{1-x}$Zr$_x$O$_2$ Nanoparticles: X-ray Absorption Near-edge Spectroscopy, Density Functional, and Time-resolved X-ray Diffraction Studies. Journal of Physical Chemistry B 2003, 107, (15), 3535-3543.
49. Reddy, B. M.; Khan, A., Nanosized CeO$_2$—SiO$_2$, CeO$_2$—TiO$_2$, and CeO$_2$—ZrO$_2$ Mixed Oxides: Influence of Supporting Oxide on Thermal Stability and Oxygen Storage Properties of Ceria. Catalysis Surveys from Asia 2005, 9, (3), 155-171.
50. Overbury, S. H.; Huntley, D. R.; Mullins, D. R.; Glavee, G. N., XANES Studies of the Reduction Behavior of (Ce$_{1-y}$Zr$_y$)O$_2$ and Rh/(Ce$_{1-y}$Zr$_y$)O$_2$. Catalysis Letters 1998, 51, (3-4), 133-138.
51. Liu, G.; Rodriguez, J. A.; Hrbek, J.; Dvorak, J.; Peden, C. H. F., Electronic and Chemical Properties of Ce$_{0.8}$Zr$_{0.2}$O$_2$(111) Surfaces: Photoemission, XANES, Density-Functional, and NO$_2$ Adsorption Studies. Journal of Physical Chemistry B 2001, 105, (32), 7762-7770.
52. Balducci, G.; Fornasiero, P.; Dimonte, R.; Kaspar, J.; Meriani, S.; Graziani, M., An Unusual Promotion of the Redox Behavior of CeO$_2$—ZrO$_2$ Solid-Solutions Upon Sintering at High-Temperatures. Catalysis letter 1995, 33, (1-2), 193-200.
53. Fornasiero, P.; Dimonte, R.; Rao, G. R.; Kaspar, J.; Meriani, S.; Trovarelli, A.; Graziani, M., Rh-loaded CeO$_2$—ZrO$_2$ Solid-Solutions as Highly Efficient Oxygen Exchangers—Dependence of the Reduction Behavior and the Oxygen Storage Capacity on the Structural Properties. Journal of Catalysis 1995, 151, (1), 168-177.
54. Reddy, B. M.; Khan, A.; Yamada, Y.; Kobayashi, T.; Loridant, S.; Volta, J. C., Structural Characterization of CeO$_2$-MO$_2$ (M=Si$^{4+}$, Ti$^{4+}$, and Zr$^{4+}$) Mixed Oxides by Raman Spectroscopy, X-ray Photoelectron Spectroscopy, and Other Techniques. Journal of Physical Chemistry B 2003, 107, (41), 11475-11484.
55. Yang, Z.; Woo, T. K.; Hermansson, K., Effects of Zr Doping on Stoichiometric and Reduced Ceria: A First-principles Study. Journal of Chemical Physics 2006, 124, (22), 224704.
56. Dutta, G.; Waghmare, U. V.; Baidya, T.; Hegde, M. S.; Priolkar, K. R.; Sarode, P. R., Origin of Enhanced Reducibility/Oxygen Storage Capacity of Ce$_{1-x}$Ti$_x$O$_2$ Compared to CeO$_2$ or TiO$_2$. Chemistry of Materials 2006, 18, (14), 3249-3256.
57. Baidya, T.; Priolkar, K. R.; Sarode, P. R.; Hegde, M. S.; Asakura, K.; Tateno, G.; Koike, Y., Local Structure of Pt and Pd Ions in Ce$_{1-x}$Ti$_x$O$_2$: X-ray Diffraction, X-ray Photoelectron Spectroscopy, and Extended X-ray Absorption Fine Structure. Journal of Chemical Physics 2008, 128, (12), 124711.
58. Yang, Z. X.; Wei, Y. W.; Fu, Z. M.; Lu, Z. S.; Hermansson, K., Facilitated Vacancy Formation at Zr-doped Ceria (111) Surfaces. Surface Science 2008, 602, (6), 1199-1206.
59. Nagai, Y.; Yamamoto, T.; Tanaka, T.; Yoshida, S.; Nonaka, T.; Okamoto, T.; Suda, A.; Sugiura, M., X-ray Absorption Fine Structure Analysis of Local Structure of 60. Guo, Y.; Lu, G. Z.; Zhang, Z. G.; Zhang, S. H.; Qi, Y.; Liu, Y., Preparation of $Ce_xZr_{1-x}O_2$ (x=0.75, 0.62) Solid Solution and Its Application in Pd-only Three-Way Catalysts. Catalysis Today 2007, 126, (3-4), 296-302.

61. Lu, Z.; Yang, Z., Interfacial Properties of $Ce_{0.7}Zr_{0.25}O_2$ Supported Noble Metals (Pd, Pt) from First Principles. European Physical Journal B 2008, 63, (4), 455-460.

62. Zhu, H. Q.; Qin, Z. F.; Shan, W. J.; Shen, W. J.; Wang, J. G., CO Oxidation at Low Temperature over Pd Supported on $CeO_2$—$TiO_2$ Composite Oxide. Catalysis Today 2007, 126, (3-4), 382-386.

63. Shapovalov, V.; Metiu, H., Catalysis by Doped Oxides: CO Oxidation by $Au_xCe_{1-x}O_2$. Journal of Catalysis 2007, 245, (1), 205-214.

64. Ye, J. L.; Wang, Y. Q.; Liu, Y.; Wang, H., Steam Reforming of Ethanol over $Ni/Ce_xT_{1-x}O_2$ Catalysts. International Journal of Hydrogen Energy 2008, 33, (22), 6602-6611.

65. Jain, A.; Zhao, X.; Kjergaard, S.; Stagg-Williams, S. M., Effect of Aging Time and Calcination on the Preferential Oxidation of CO over Au Supported on Doped Ceria. Catalysis Letters 2005, 104, (3-4), 191-197.

66. Manzoli, M.; Avgouropoulos, G.; Tabakova, T.; Papavasiliou, J.; Ioannides, T.; Boccuzzi, F., Preferential CO Oxidation in $H_2$-rich Gas Mixtures over Au/doped Ceria Catalysts. Catalysis Today 2008, 138, (3-4), 239-243.

67. Biswas, P.; Kunzru, D., Steam Reforming of Ethanol on Ni—$CeO_2$—$ZrO_2$ Catalysts: Effect of Doping with Copper, Cobalt and Calcium. Catalysis Letters 2007, 118, (1-2), 36-49.

68. Srinivas, D.; Satyanarayana, C. V. V.; Potdar, H. S.; Ratnasamy, P., Structural Studies on NiO—$CeO_2$—$ZrO_2$ Catalysts for Steam Reforming of Ethanol. Applied Catalysis A-General 2003, 246, (2), 323-334.

69. Wang, R.; Crozier, P. A.; Sharma, R.; Adams, J. B., Measuring the Redox Activity of Individual Catalytic Nanoparticles in Cerium-based Oxides. Nano Letter 2008, 8, (3), 962-967.

70. Avgouropoulos, G.; Manzoli, M.; Boccuzzi, F.; Tabakova, T.; Papavasiliou, J.; Ioannides, T.; Idakiev, V., Catalytic Performance and Characterization of Au/doped-ceria Catalysts for the Preferential CO Oxidation Reaction. Journal of Catalysis 2008, 256, (2), 237-247.

71. Zhou, Y. H., Zhou, J., Interactions of Ni Nanoparticles with Reducible $CeO_2$ (111) Thin Films. Journal of Physical Chemistry C, 2012, 116, (17), 9544-9549.

72. Zhou, Y. H., Zhou, J., $Ti/CeO_x$ (111) Interfaces Studied by XPS and STM. Surface Science, 2012, 606, (7-8), 749-753.

73. Zhou, Y. H., Zhou, J., Growth and Surface Structure of Ti-Doped $CeO_x$ (111) Thin Films. Journal of Physical Chemistry Letters, 2010, 1, (11), 1714-1720.

74. Vlaic, G.; Di Monte, R.; Fornasiero, P.; Fonda, E.; Kaspar, J.; Graziani, M., The $CeO_2$—$ZrO_2$ System: Redox Properties and Structural Relationships. In Catalysis and Automotive Pollution Control IV 1998, 116, 185-195.

75. Youn, M. H.; Seo, J. G.; Park, S.; Park, D. R.; Jung, J. C.; Kim, P.; Song, I. K., Hydrogen Production by Autothermal Reforming of Ethanol over Ni—Ti—Zr Metal Oxide Catalysts. Renewable Energy 2009, 34, (3), 731-735.

Example 2: Activity of $Ce_{1-x}Ti_xO_{2-\delta}$ Supported Nickel Catalysts for Dry Reforming of Methane Abstract Active $Ce_{1-x}Ti_xO_{2-\delta}$ (x=0.1-0.5) supported nickel were synthesized by sol-gel and impregnation methods. X-ray diffraction data show the formation of $Ce_{1-x}Ti_xO_{2-\delta}$ mixed oxides for lower Ti compositions. NiO is formed over $Ce_{1-x}Ti_xO_{2-\delta}$ and its particle size increases with the nickel loading from 0.5 to 10 wt. %. The dry reforming of methane activity over Ni depends on the composition of the support, the Ni loading, and the reaction temperature. Optimum activity was observed over 2.4 wt. % Ni supported on $Ce_{0.7}Ti_{0.3}O_{2-\delta}$. It delivers $CH_4$ and $CO_2$ conversions of 54% and 61% with $H_2$ and CO yields of 51% and 56% at 650° C. 92% and 94% of $CH_4$ and $CO_2$ conversions with the $H_2$/CO ratio close to unity can be obtained at 800° C. The enhanced reactivity and stability of the catalyst is attributed to the effect of Ti doping in ceria as well as the strong interaction between Ni and $Ce_{0.7}Ti_{0.3}O_{2-\delta}$.

1. INTRODUCTION

Dry reforming of methane (DRM, $CH_4+CO_2 \rightarrow 2H_2+2CO$, $\Delta H_{298K}$+247 kJ*mol$^{-1}$) has attracted attention over recent decades because of (a) simultaneous utilization of two major greenhouse gases ($CH_4$ and $CO_2$) and (b) the ability to produce syngas (mixture of $H_2$ and CO) over heterogeneous catalysts. [1-3] Hydrogen is the product from DRM and can be used as an energy source. [4] The syngas can be converted further into synthetic petroleum as fuels. [5] Compared to other reforming processes including steam reforming of methane and partial oxidation of methane, DRM is environmentally friendly. [6-8] The proportional consumption of carbon dioxide and methane could reduce the carbon impact that leads to a "greener" consumption of methane. The reaction also favors the formation of a $H_2$/CO ratio close to unity that is desirable for Fischer-Tropsch process. [9] While DRM is endothermic in nature and requires high reaction temperatures, there are studies that indicated the use of DRM for industrial processes that contain both methane and $CO_2$ could lower the overall operation cost by 20% compared to other reforming reactions. [1, 10] However, the DRM reaction is accompanied with two major side reactions: Boudouard reaction ($2CO \rightarrow C+CO_2$, $\Delta H_{298K}$=−171 kJ*mol$^{-1}$) and methane activation ($CH_4 \rightarrow 2H_2+C$, $\Delta H_{298K}$=+75 kJ*mol$^{-1}$), both of which can cause the deposition of coke over the catalyst and thus the catalyst deactivation. [1, 3]

Oxide supported metal catalysts have been widely studied for DRM. [11, 12] The overall activity depends on the type of the active metal, the nature of the support including the basicity/acidity and oxygen storage capacity, and the interaction between the metal and support. [1, 13-15] It is commonly viewed that oxide supports, which can disperse the active metal and allow a better interaction with $CO_2$, are desirable for DRM. [16, 17] Since the metal acts as active sites where $CH_4$ is adsorbed and dissociated, it is important that the metal has high activity for C—H bond cleavage. [1] Noble metals, including Rh, Ru, Pt have been proven to perform well for DRM and show great thermal stability and coke resistance. [18-21] However, the high cost and limited availability of these metals restrict their use for commercial catalysts. The use of a Ni-based catalyst is more desirable in DRM because it is highly active for methane dissociation and more economical and easily available. [17, 22] However, Ni may be prone to deactivation due to carbon deposits. [23] Nickel nanoparticles also sinter at high reaction temperatures, which may result in the loss of catalyst activity during the reaction. [2] To help disperse Ni as small nanoparticles and promote the DRM catalytic activity and stability towards carbon deposition, various oxides including $Al_2O_3$ [24], $TiO_2$ [25], $SiO_2$ [26], MgO [27], $ZrO_2$ [28], $La_2O_3$ [29], $CeO_2$ [22, 30], and $Ce_{1-x}Zr_xO_2$ [31] have been examined as the supports for Ni.

Ceria has been considered as a promising support for DRM due to its unique redox properties, high oxygen storage capacity, and strong metal-support interactions (SMSI). [32-34] Over ceria-supported Ni, ceria contributes to the adsorption and activation of $CO_2$. Methane activation occurs over Ni, which can be promoted by the ceria support. As shown in the study by Rodriguez's group, Ni—$CeO_2$ catalysts show DRM activity at a low temperature (427° C.). Density-functional results of their experiment show that the effective barrier for methane activation is lowered from 0.88 eV on Ni (111) to 0.15 eV when Ni is supported over $CeO_{2-x}$ (111). [22] In the DRM reaction, the presence of the ceria support can also suppress carbon deposition over Ni to a degree, which increases the catalytic performance and stability of Ni. [35] This is due to unique redox properties of $CeO_2$ as demonstrated in the facile transition between $Ce^{4+}$ and $Ce^{3+}$ and formation of oxygen vacancies in the lattice; therefore, it can act as an oxygen buffer in a redox reaction. [36, 37] Reduced ceria with oxygen vacancies can promote the oxidation of surface carbon derived from methane, which has been shown to be a crucial ability to resist coke deposits. [21] Moreover, SMSI can assist in anchoring and stabilizing Ni and thus the extent of the of Ni particle sintering at high temperatures can be reduced. [38, 39] Good oxygen storage capacity of ceria and strong SMSI can also promote promising dry reforming activity and stability of Ni when using other hydrocarbons. [40-42]

Despite continuing efforts and research interest in DRM catalysts, there is still a strong need to develop stable, efficient, and economical catalysts that can effectively work at desirable reaction temperatures with high conversion of reactants, high yield of products, and coke resistance to avoid catalyst deactivation. [1, 2, 23] Ni supported on $CeO_2$ has been shown to be an effective catalyst for DRM. [22, 43] Metal-doped ceria could provide a potentially better catalytic support for practical applications compared to pure ceria. [44, 45] One main issue regarding the use of pure ceria as real-world catalytic supports is its poor thermal stability at high temperatures. [46] It can undergo sintering which causes the loss of its crucial oxygen storage capacity and redox properties. To overcome the issue, doping ceria with additional metal elements can enhance its thermal stability. [47] The interaction of metal dopant with ceria can also lower the activation energy needed for the release of oxygen, which results in the improvement of its redox properties and oxygen storage capacity and consequently the enhancement of its catalytic activity. [48-51] Ti was found to be a good dopant to ceria. [44, 52-54] Ti-doped ceria has a lower formation energy of oxygen vacancies compared to pure ceria. [55, 56] The Ce/Ti ratio can be an important parameter in tuning the properties of ceria. Petallidou and coworkers [57] prepared and tested $Pt/Ce_{1-x}Ti_xO_2$ catalysts for the water-gas shift reaction, and they observed enhanced reducibility and improved activity over ceria support with a Ce/Ti ratio of 4/1 compared to $Ni/CeO_2$. [45, 58] Our group has been interested in the study of model $CeO_2(111)$ thin films with Ti dopants and our results show that doping ceria with Ti can significantly reduce the sintering of metal particles including Ni with heating in vacuum. [55, 59, 60] In this present work, we report the preparation of $Ni/Ce_{1-x}Ti_xO_{2-\delta}$ powder samples with controlled Ce/Ti composition ratios by sol-gel methods. Here, $\delta$ indicates the loss oxygen from stoichiometric $CeO_2$ and x represents the Ti doping composition in ceria. The role of Ti-doped ceria supports was studied in detail in our study with respect to the reactivity, stability, and coke resistance of Ni in the DRM reaction.

2. MATERIALS AND METHODS 2.1 Synthesis of $Ce_{1-x}Ti_xO_{2-\delta}$ Supported Ni Catalysts $Ce_{1-x}Ti_xO_{2-\delta}$ with controlled Ti compositions ($0.0 \leq x \leq 0.5$) was prepared by mixing proper amounts of cerium (III) nitrate hexahydrate and titanium (IV) isopropoxide (Sigma Aldrich) with citric acid (Fisher Scientific, USA). [57] For an example, 5.670 g of citric acid, 6.312 g of cerium (III) nitrate hexahydrate, and 62.3 mL of titanium (IV) isopropoxide stock solution (28.302 g/L) were used for the preparation of $Ce_{0.7}Ti_{0.3}O_{2-\delta}$. The mixture was heated at 60° C. under stirring until the formation of a gel. The gel material was dried at 120° C. for 17 h and subsequently calcined at 800° C. for 2 h to remove the precursor materials. The obtained product displayed a light-yellow color. $Ce_{1-x}Ti_xO_{2-\delta}$ supported nickel catalysts were prepared by the impregnation method. Initially, 1.0 M nickel stock solution was prepared by dissolving a known quantity of nickel (II) nitrate hexahydrate (Sigma Aldrich) with deionized water. Then, 1.000 g of $Ce_{1-x}Ti_xO_{2-\delta}$ was added into the appropriate Ni stock solution under stirring. Ni samples with nominal loadings between 0.5 and 10.0 wt. % were prepared by varying the quantity of nickel stock solution. The mixture was stirred for 2 h at 70° C. followed by drying at 120° C. for 12 h. The dried powder was calcined at 800° C. for 2 h in the furnace to remove the organic impurity from the catalyst. The calcined catalyst was stored into an airtight container.

2.2 Characterization of $Ni/Ce_{1-x}Ti_xO_{2-\delta}$ catalysts

The catalysts as synthesized as well as after DRM reactivity tests were characterized using physical and chemical techniques. X-ray diffraction (XRD) of powder samples were recorded on a Rigaku smartlab diffractometer with Cu K$\alpha$ radiation (40 kV, 40 mA, 1.5419 Å) and a scanning rate of 20°/min. The diffraction patterns were collected at ambient conditions between 2$\theta$ values of 20° and 90° with a step size of 0.02°. The crystal phases of catalysts were identified using the JCPDS database. The lattice spacing of ceria supports and Ni particle size derived from the peak positions were determined based on Bragg's diffraction law and Scherrer equation. Scanning electron microscopy-energy combined with energy-dispersive spectroscopy (SEM-EDS) were used for the analysis of surface morphology and chemical composition of the samples using a FEI Quanta 250 apparatus. The samples were prepared by crushing into small powders and dispersing onto a thin layer of a carbon tape. The actual Ni loading was examined by inductively coupled plasma optical emission spectrometry (ICP-OES, Perkin Elmer Elan 6000) with sample preparation of dissolving catalysts in aqua regia solutions. The Brunauer-Emmet-Teller (BET) surface area of the samples was performed by $N_2$ physisorption acquired at liquid $N_2$ temperature (−196° C.) using a Micromeritics ASAP 2020 apparatus. Before the analysis, all powder samples were degassed at 120° C. for 200 min under vacuum conditions. The metal dispersion and metallic surface area of fresh catalysts were examined by $H_2$ chemisorption using the same Micromeritics ASAP 2020 instrument. The analysis was performed using 0.100 g of catalyst. The samples were preheated in the helium flow at 110° C. for 30 min and reduced in hydrogen flow at 400° C. for 60 min. An evacuation was applied at 400° C. and 35° C. for 120 min. Then the analysis was performed at 35° C.

2.3 Catalytic Testing

Dry reforming of methane was carried out in a fixed-bed continuous flow reactor that is made up of a quartz glass with an internal diameter of 0.25 inches and a length of 24 inches. The catalytic bed of the reactor was placed at the center in the ceramic fiber heater (VC402A12A, WATLOW, USA) equipped with a ramp controller (CN7800, Omega). Mass flow controllers (FMA-700 Series, Omega) were used to control gas flow rates for all reactivity tests. Typically, 0.100 g of the powder catalyst was packed into the middle of the glass tube reactor and retained by quartz wool at both ends. The actual temperature of catalyst bed was measured by a K-type thermocouple that is close the catalyst bed. Helium gas was purged through the reactor at 50 ml/min for 15 min to maintain an inert atmosphere in the reactor prior to heating to the desired reaction temperature. Catalysts were reduced at 400° C. or 550° C. with a 20 ml/min flow rate of hydrogen for 1 hour, followed by cooling down to room temperature. A total flow of 25 ml/min with a 1:1 ratio of $CH_4$ (99.97% purity, UHP grade, Rocky Mountain Air Solutions) and $CO_2$ (99.998% purity, UHP grade, PRAX-AIR) was introduced for the DRM reaction. GHSV of 15 L $g^{-1}h^{-1}$ is determined based on the catalyst mass of 0.100 g. A flow of 30 ml/min He (99.995%, UHP grade, PRAXAIR) was also added as the carrier gas (GHSV=33 L $g^{-1}h^{-1}$) for DRM and the catalytic performance was measured to be the same as to the reactant gas mixture without He. Catalytic tests were performed at temperatures ranging from 300 to 800° C. The outlet gas composition of reactants and products after condensation of $H_2O$ was analyzed after 10-30 min of reaction at selected temperatures using an online gas chromatograph (Trace ultra, Thermo scientific) equipped with thermal conductivity detector (TCD) and a HP-PLOT/Q+PT column (60 m×0.535 mm×40 μm). A flow of 2 ml/min of nitrogen (99.999% UHP grade, PRAXAIR) was used as a carrier gas throughout the GC analysis. The conversion of the reactants and yield of products were calculated using the following equations. [61, 62] The spent catalysts were collected by running inert He gas after the DRM reaction, followed by cooling down to room temperature and stored in an airtight container.

$$CH_4 \text{ Conversion (\%)} = \frac{\text{moles of } CH_4 \text{ converted}}{\text{moles of } CH_4 \text{ input}} \times 100\% \quad \text{Eq. 1}$$

$$CO_2 \text{ Conversion (\%)} = \frac{\text{moles of } CO_2 \text{ converted}}{\text{moles of } CO_2 \text{ input}} \times 100\% \quad \text{Eq. 2}$$

$$H_2 \text{ Yield (\%)} = \frac{\text{moles of } H_2 \text{ produced}}{2 \times \text{moles of } H_2 \text{ input}} \times 100\% \quad \text{Eq. 3}$$

$$CO \text{ Yield (\%)} = \frac{\text{moles of CO produced}}{(\text{moles of } CH_4 \text{ input} + \text{moles of } CO_2 \text{ input})} \times 100\% \quad \text{Eq. 4}$$

3. RESULTS AND DISCUSSION 3.1 the Effect of Reaction Temperatures and Ce/Ti Ratios Ce/Ti ratios were varied in the synthesis of $Ce_{1-x}Ti_xO_{2-\delta}$ supports for Ni and the XRD patterns of ceria supports with different Ti concentrations are reported in FIG. 3A. Pure $CeO_2$ exhibits sharp XRD peaks. Different peaks of $CeO_2$ were observed at 28.5°, 33.1°, 47.5°, 56.3°, 59.1°, 69.4°, 76.7°, 79.1°, and 88.4° which can be attributed to (111), (200), (220), (311), (222), (400), (331), (420), and (422) planes of the face-centered cubic cell of the fluorite structure of ceria (JCPDS 43-1002). The XRD patterns of $Ce_{1-x}Ti_xO_{2-\delta}$ (x=0.1, 0.2, and 0.3) show the same diffraction peaks as those from $CeO_2$. However, the $CeO_2$ peaks broaden with increasing Ti doping in ceria. New XRD peaks at 25.3°, 30.9° and 54.3° corresponding $TiO_2$ (JCPDS 21-1272 and JCPDS 29-1360) were observed for $Ce_{0.6}Ti_{0.4}O_{2-\delta}$ and $Ce_{0.5}Ti_{0.5}O_{2-\delta}$, which suggests the formation of segregated titania crystallites in these samples. Lattice constants calculated based on the XRD data demonstrate a decrease of the ceria lattice value from 5.42 to 5.39 Å with an increase of Ti composition, x, from 0.0 to 0.5. This is consistent with incorporation of $Ti^{4+}$ into ceria and formation of a $Ce_{1-x}Ti_xO_{2-\delta}$ mixed oxide. The atomic radius of $Ti^{4+}$ (0.75 Å) is smaller than that of $Ce^{4+}$ (0.97 Å) and substitution of Ce with Ti would result in a smaller crystal size of the material. [63] The decreasing trend of lattice constants is also in agreement with the previously reported study over $Ce_{1-x}Ti_xO_{2-\delta}$. [57] Our XRD data show that uniform mixed oxides of $Ce_{1-x}Ti_xO_{2-\delta}$ can be prepared with lower Ce/Ti ratios using the sol-gel method, which is supported by the SEM-EDS results (FIGS. 3D-3H). SEM images of $CeO_2$ and $Ce_{0.7}Ti_{0.3}O_{2-\delta}$ catalysts are presented in FIGS. 3D and 3E. Pure $CeO_2$ shows the dense morphology formed by large agglomeration of particles indicated in FIG. 3D. Pores were observed on the surface of the material. The $Ce_{0.7}Ti_{0.3}O_{2-\delta}$ support displays a similar structure compared to that of $CeO_2$ shown in FIG. 3E. The composition analysis by energy dispersive spectroscopy (not shown) shows Ce and O constituents in the $CeO_2$ sample. The mixed oxide (e.g. $Ce_{0.7}Ti_{0.3}O_{2-\delta}$) shows three constituents, Ce, Ti, and O with the corresponding weight percent value of 56.8%, 8.6%, and 34.6% that are consistent to the $Ce_{0.7}Ti_{0.3}O_{2-\delta}$ sample. Furthermore, energy dispersive spectroscopy for elemental mapping data (not shown) suggest that all three elements are uniformly distributed across the sample.

Figure 3A:
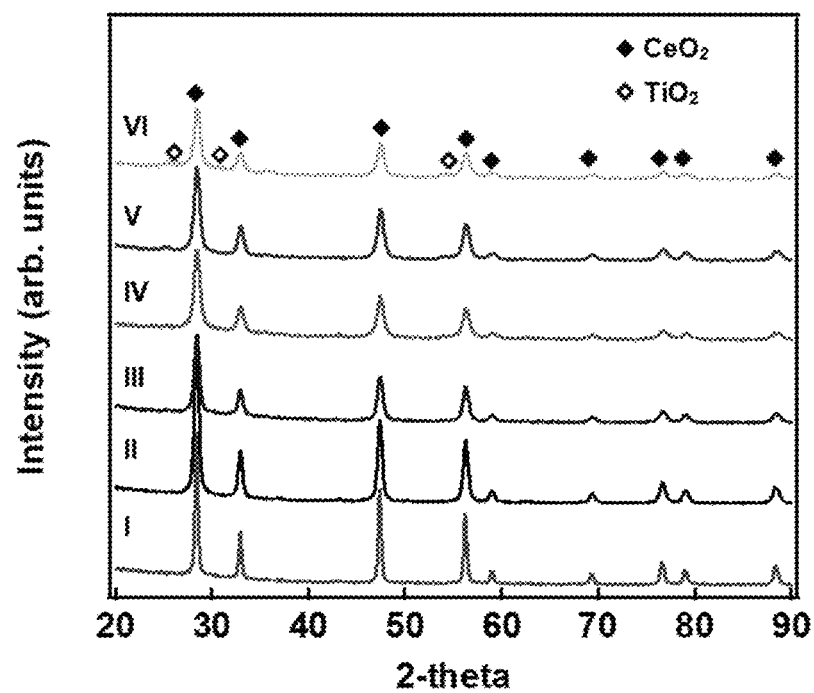
FIG. 3A. XRD patterns collected from as-prepared samples of $CeO_2$ (I), $Ce_{0.9}Ti_{0.1}O_{2-\delta}$ (II), $Ce_{0.8}Ti_{0.2}O_{2-\delta}$ (II), $Ce_{0.7}Ti_{0.3}O_{2-\delta}$ (IV), $Ce_{0.6}Ti_{0.4}O_{2-\delta}$ (V), and $Ce_{0.5}Ti_{0.5}O_{2-\delta}$ (VI)
Figure 3B:
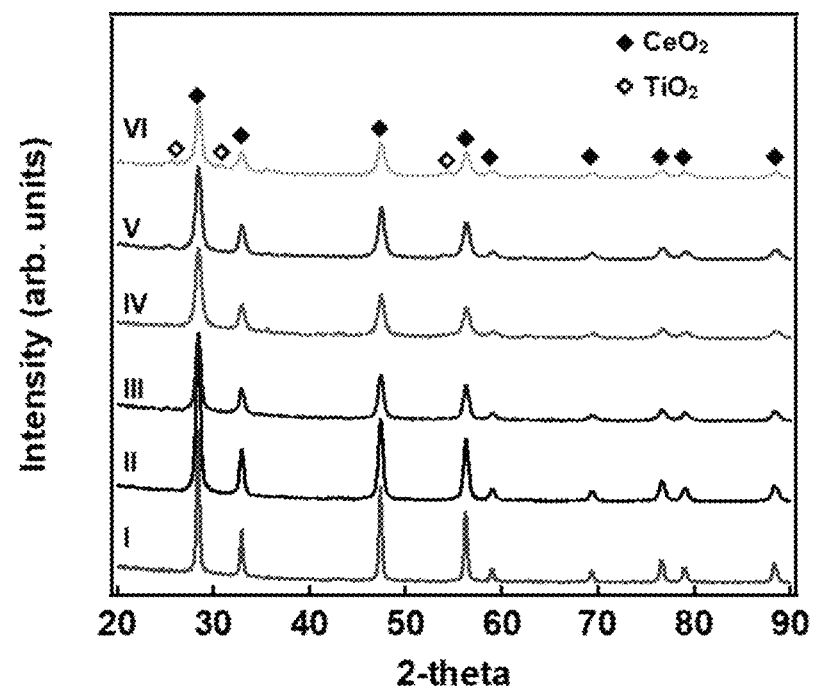
(FIG. 3B) XRD patterns of nominal 3.0 wt. % Ni dispersed over various supports as indicated in (a)

FIG. 3B shows the XRD patterns of Ni supported over ceria with varied Ce/Ti ratios and a nominal Ni weight loading of 3 wt. %. No XRD peak of Ni species was observed in all the spectra at this Ni loading level. SEM images of the $Ni/Ce_{0.7}Ti_{0.3}O_{2-\delta}$ catalysts are presented as an example in FIG. 3F. The EDS spectrum of the sample displays the presence of all expected constitutes including Ce (59.6 wt. %), Ti (8.7 wt. %), Ni (2.4 wt. %), and O (29.3 wt. %). The weight loading of Ni was determined further to be 2.4 wt. % by ICP-OES analysis. The BET surface area values of as-synthesized supports are in the range between 10-40 $m^2/g$. The highest surface area of the supports was obtained at a Ce/Ti ratio of 7/3. After adding 2.4 wt. % of Ni, a drop in the BET surface area value was observed among all the ceria supports.

FIGS. 4A-4F show the temperature-dependent DRM activity over Ni with a 3 wt. % loading dispersed on $CeO_2$, $Ce_{0.7}Ti_{0.3}O_{2-\delta}$, and $Ce_{0.5}Ti_{0.5}O_{2-\delta}$. The choice of the supports was based on our studies of the methane activation/decomposition activity at 500° C. (data not shown). In methane decomposition, carbon and hydrogen are formed upon C—H bond breaking. The catalytic decomposition of methane is considered as a metal catalyzed reaction and a high hydrogen yield can be achieved at elevated temperatures. Our data show the methane conversion with corresponding hydrogen yield over Ni decreases with the increase of Ti doping composition from 0 to 0.5 in $Ce_{1-x}Ti_xO_{2-\delta}$ except for Ni over the $Ce_{0.7}Ti_{0.3}O_{2-\delta}$ support.

Ni/Ce$_{0.7}$Ti$_{0.3}$O$_{2-\delta}$ exhibits the highest reaction activity toward methane decomposition among Ni supported over all synthesized ceria supports shown in FIG. 3A. Therefore, Ce$_{0.7}$Ti$_{0.3}$O$_{2-\delta}$ along with reference samples of pure CeO$_2$ and Ce$_{0.5}$Ti$_{0.5}$O$_{2-\delta}$ were chosen as the catalytic supports for Ni for the DRM reaction to elucidate the effect of Ce/Ti ratios (FIGS. 4A-4F).

Figure 4A:
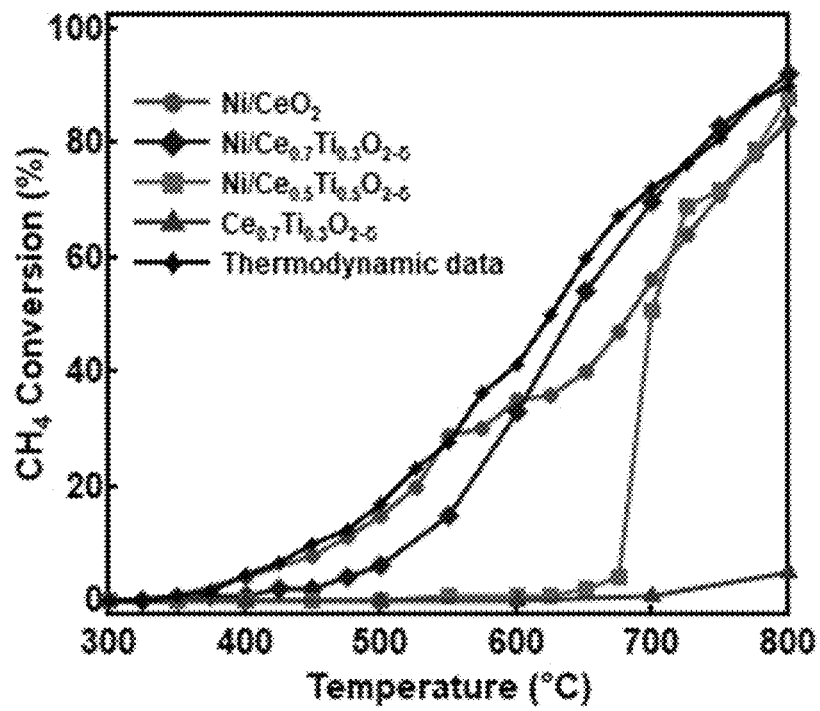
FIGS. 4A-4F. Temperature-dependent DRM data of $CH_4$ conversion (FIG. 4A), $CO_2$ conversion (FIG. 4B), $H_2$ yield (FIG. 4C), and CO yield (FIG. 4D) for nominal 3.0 wt. % Ni dispersed over $CeO_2$, 2.4 wt. % Ni/$Ce_{0.7}Ti_{0.3}O_{2-\delta}$, and nominal 3.0 wt. % Ni/$Ce_{0.5}Ti_{0.5}O_{2-\delta}$; DRM data for $Ce_{0.7}Ti_{0.3}O_{2-\delta}$ and thermodynamic equilibrium data for DRM assuming no carbon formation occurs [1] are shown for comparisons in FIGS. 4A-4D.
Figure 4B:
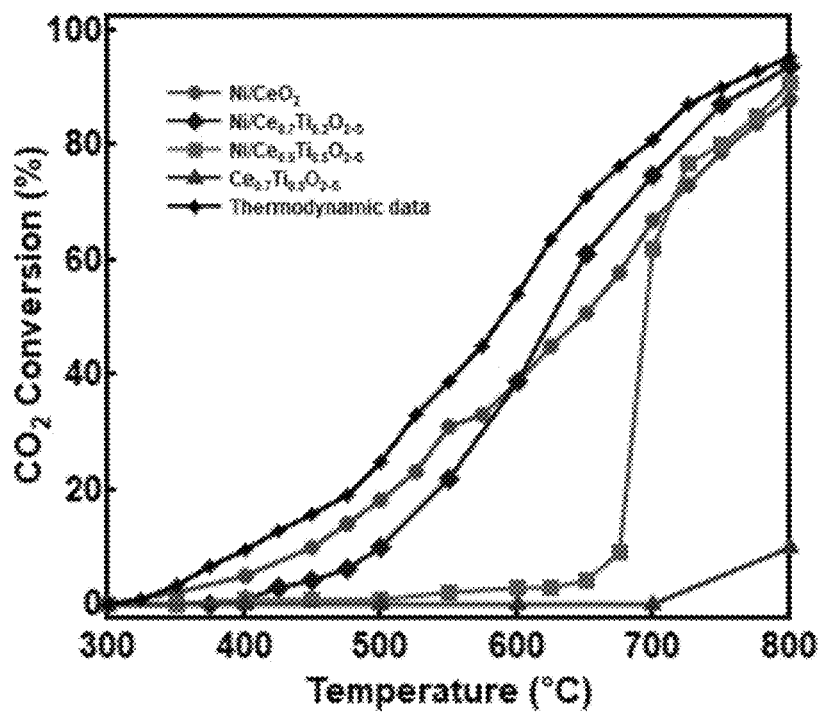
Figure 4C:
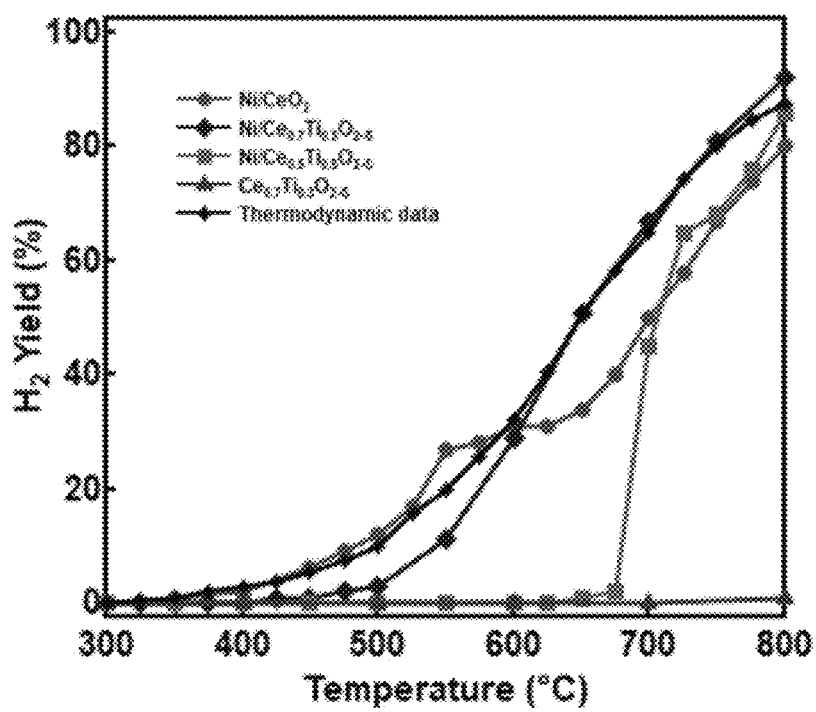
Figure 4D:
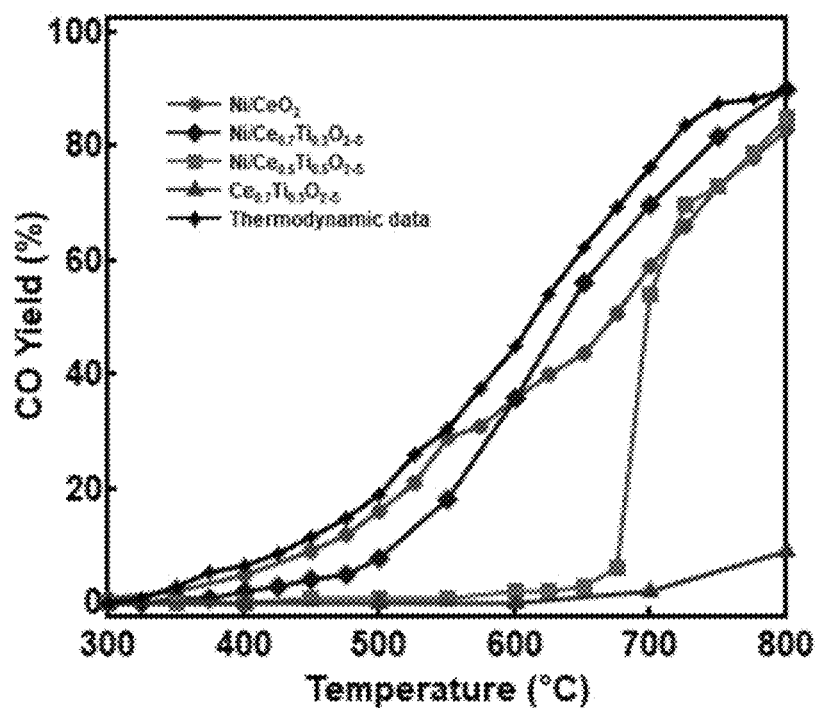

0.100 g of catalyst was used in the DRM reaction and the temperature was increased from 300 to 800° C. The gaseous products (H$_2$ and CO) and unreacted reactants (CH$_4$ and CO$_2$) were analyzed by GC after a 10-30 min reaction time for each temperature increment of 25 or 50° C. (FIGS. 4A-4F). The reactant conversions for CH$_4$ and CO$_2$ continuously increase with the increase of the temperature, which is attributed to the endothermic nature of the DRM reaction. The conversion of relatively equal amount of CH$_4$ and CO$_2$ was observed. Over the Ni/Ce$_{0.7}$Ti$_{0.3}$O$_{2-\delta}$ catalyst with a 2.4 wt. % Ni loading as confirmed by ICP measurements, 54% and 61% of CH$_4$ and CO$_2$ conversions were observed at 650° C. H$_2$ and CO yields are 51% and 56%. 92% and 94% of CH$_4$ and CO$_2$ conversions were observed when further increasing the temperature to 800° C. as indicated in FIGS. 4A and 4B. The yield of products (H$_2$ and CO) increase with the increase in the conversion of the reactants at higher reaction temperatures. H$_2$ yield increases by 41 percentage points upon raising the temperature from 650 to 800° C. as shown in FIG. 4C. The results are close to the reported thermodynamic equilibrium data, suggesting that the catalyst has a high DRM activity. [1] Shinde and Madras have reported equal conversions of both reactants (CH$_4$ and CO$_2$) for the DRM reaction over the Ni/TiO$_2$ catalyst between 400 and 700° C., due to negligible reverse water gas shift reaction (RWGS: H$_2$+CO$_2$→H$_2$O+CO, $\Delta H_{298K}$=+41 kJ*mol$^{-1}$). [3, 25] Our experimental data shows the CH$_4$ conversion is slightly lower than that of CO$_2$ and CO formation is higher than H$_2$ during the temperature range. The result indicates the RWGS reaction is present in our study.

Figure 4E:
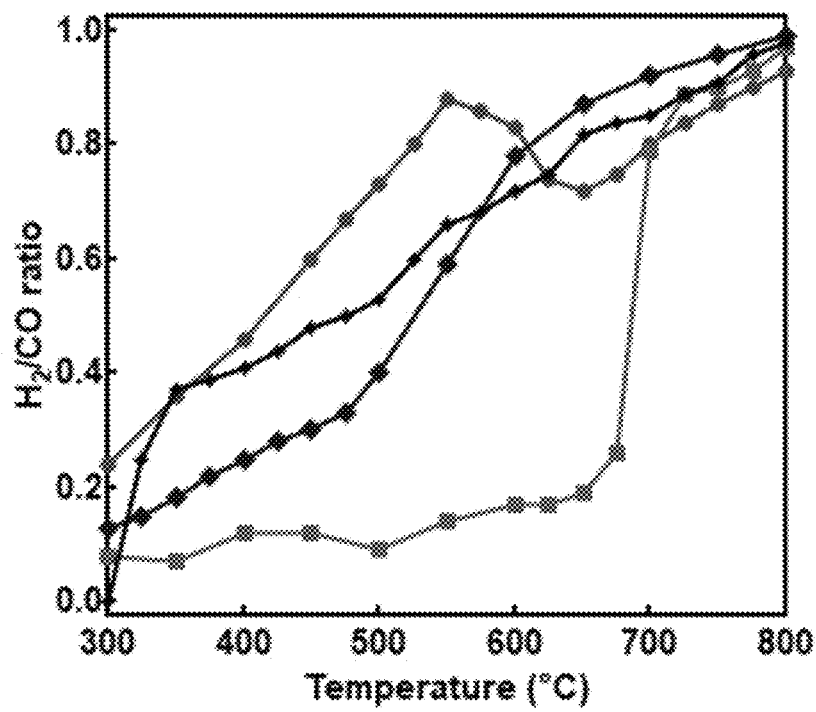
Figure 4F:
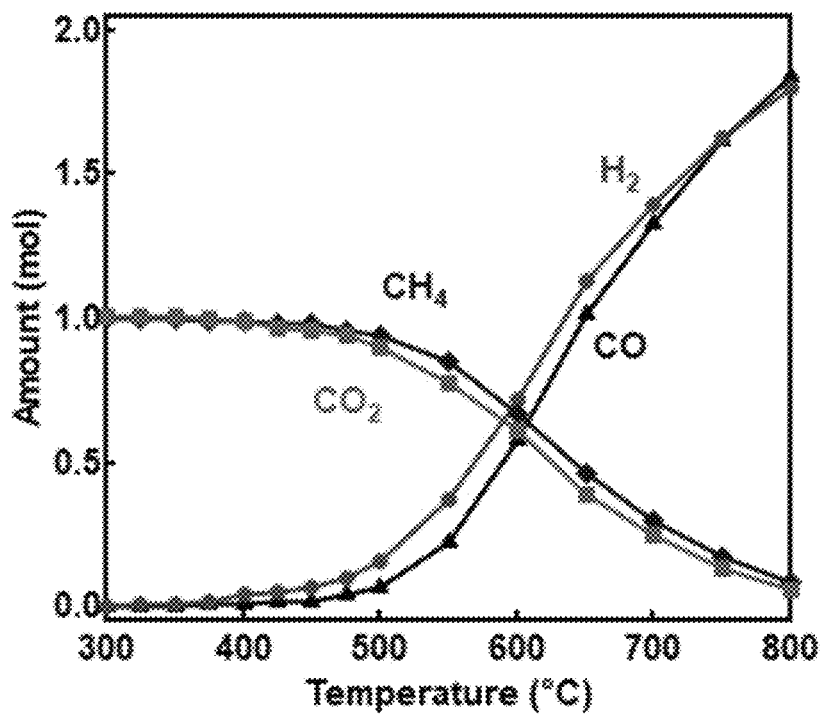

FIGS. 4A and 4B compare the conversion of CH$_4$ and CO$_2$ for 3 wt. % Ni dispersed on CeO$_2$, Ce$_{0.7}$Ti$_{0.3}$O$_{2-\delta}$, and Ce$_{0.5}$Ti$_{0.5}$O$_{2-\delta}$ with selected Ce/Ti ratios. As a contrast experiment, the DRM reaction was first performed over pure Ce$_{0.7}$Ti$_{0.3}$O$_{2-\delta}$ with no Ni loading. Little methane conversion was observed below 700° C. This is consistent with the absence of active Ni metal sites for methane activation. A small amount of methane conversion (5%) was detected at 800° C., which is likely the result of the thermal decomposition of methane (CH$_4$→2H$_2$+C, $\Delta H_{298K}$=+75 kJ*mol$^{-1}$). 10% of CO$_2$ conversion was observed at 800° C. over the support. All Ni samples (Ni/CeO$_2$, Ni/Ce$_{0.7}$Ti$_{0.3}$O$_{2-\delta}$, Ni/Ce$_{0.5}$Ti$_{0.5}$O$_{2-\delta}$) exhibit DRM activity, which increases with the reaction temperature. However, these catalysts activate the DRM reaction at different temperatures. The Ni/CeO$_2$ catalyst shows the DRM activity around 350° C. The DRM activity was not observed to a measurable degree until 450° C. over Ni/Ce$_{0.7}$Ti$_{0.3}$O$_{2-\delta}$ and a much higher temperature of 650° C. over Ni/Ce$_{0.5}$Ti$_{0.5}$O$_{2-\delta}$. The Ni/CeO$_2$ catalyst delivers the highest conversion and product yield up to the temperature of 600° C. At 600° C., Ni/CeO$_2$ and Ni/Ce$_{0.7}$Ti$_{0.3}$O$_{2-\delta}$ exhibit a similar behavior with the CH$_4$ and CO$_2$ conversions of 34% and 39% and the H$_2$ and CO yields of 30% and 36%. With further increase of the temperature from 600 to 800° C., the Ni/Ce$_{0.7}$Ti$_{0.3}$O$_{2-\delta}$ shows a better activity. Little DRM activity was shown over Ni/Ce$_{0.5}$Ti$_{0.5}$O$_{2-\delta}$ until 650° C. However, the activity increases sharply at 700° C. and reaches that of Ni/CeO$_2$. At 800° C., it shows a slightly better performance compared to Ni/CeO$_2$. The H$_2$/CO ratios were calculated and are shown in FIG. 4E. The H$_2$/CO ratio of Ni/CeO$_2$ increases to 0.88 when the reaction temperature ramps to 550° C. However, it drops continuously and reaches 0.72 with further increase of the temperature to 650° C. followed by an increase again to 0.93 at 800° C. The H$_2$/CO ratio measured over Ni/Ce$_{0.5}$Ti$_{0.5}$O$_{2-\delta}$ is 0.19 at 650° C., which is the result of the low DRM activity. It increases rapidly to 0.79 at 700° C. and 0.97 at 800° C. The Ni/Ce$_{0.7}$Ti$_{0.3}$O$_{2-\delta}$ sample shows a consistent increasing trend of the H$_2$/CO ratio over the entire temperature range. The H$_2$/CO ratio is 0.92 at 700° C. and close to unity at 800° C. It has been shown that major side reactions in DRM including RWGS, Boudouard reaction, and methane decomposition were favorable to occur in the temperature range between 550 and 700° C., which can influence the conversions of CH$_4$ and CO$_2$, H$_2$ and CO yields, as well as corresponding H$_2$/CO ratio. [64] Our data suggest that Ni over the ceria support with the Ce/Ti ratio of 7/3 shows a promising DRM activity with a reduced extent of side reactions.

The DRM reaction over Ni/CeO$_2$ has been investigated and in general, Ni/CeO$_2$ catalyst shows less than 40% conversion of methane at 650° C. [65, 66] Higher methane conversion of ~60% can be obtained over Ni supported over ceria with a specific morphology, like nanorods. [67] In our study, Ni supported on CeO$_2$ displays the methane conversion of 40%. However, Ni supported on Ce$_{0.7}$Ti$_{0.3}$O$_{2-\delta}$ has a higher conversion of 54%. With further increase of Ti composition to 0.5 in Ce$_{0.5}$Ti$_{0.5}$O$_{2-\delta}$, the supported Ni only shows a 2% methane conversion under the same condition. At a higher temperature of 750° C., the methane conversion for Ni supported on CeO$_2$, Ce$_{0.7}$Ti$_{0.3}$O$_{2-\delta}$, and Ce$_{0.5}$Ti$_{0.5}$O$_{2-\delta}$ increase to 71%, 83%, and 72%. The Ni/Ce$_{0.7}$Ti$_{0.3}$O$_{2-\delta}$ catalysts in our study shows a promising activity under DRM conditions compared to reported results of other active metal catalysts or Ni supported over different oxides. [1, 13, 17, 66, 68, 69]

Figure 3C:
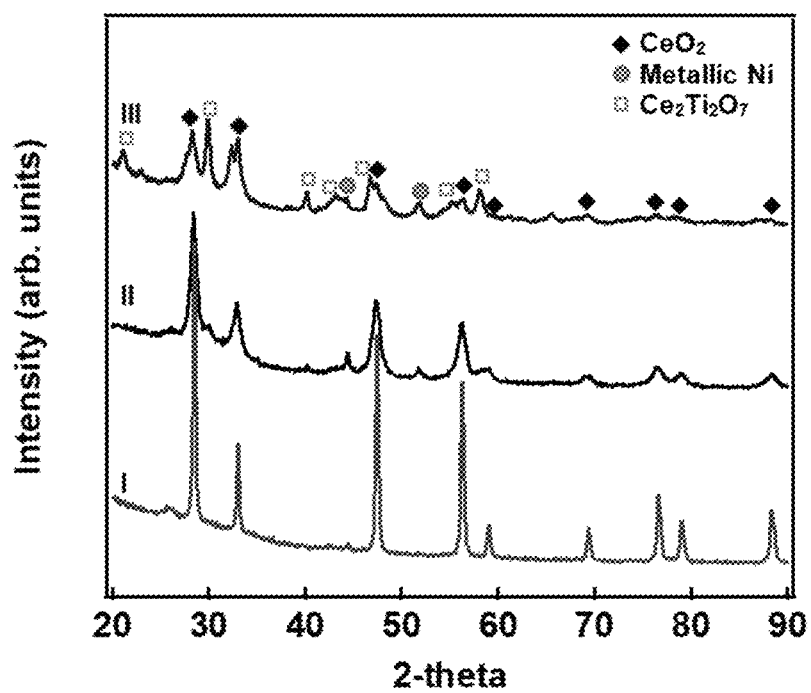
(FIG. 3C) spent samples of nominal 3.0 wt. % Ni dispersed on $CeO_2$ (I), $Ce_{0.7}Ti_{0.3}O_{2-\delta}$ (II), and $Ce_{0.5}$. $Ti_{0.5}O_{2-\delta}$ (III); SEM images of as-prepared samples of $CeO_2$ (FIG. 3D), $Ce_{0.7}Ti_{0.3}O_{2-\delta}$ (FIG. 3E), 2.4 wt. % Ni/$Ce_{0.7}Ti_{0.3}O_{2-\delta}$ (FIG. 3F), as well as spent samples of 2.4 wt. % Ni/$Ce_{0.7}Ti_{0.3}O_{2-\delta}$ after the DRM reaction on stream for 0.5 h (FIG. 3G) and 50 h (FIG. 3H).
Figure 3D:
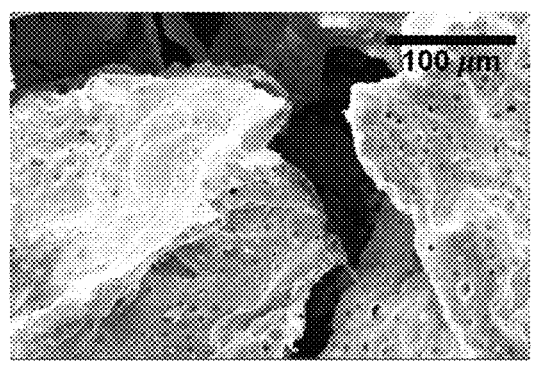
Figure 3E:
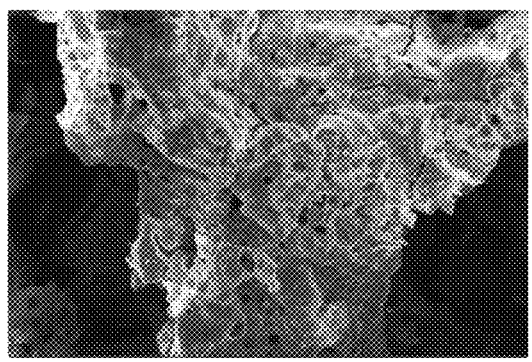
Figure 3F:
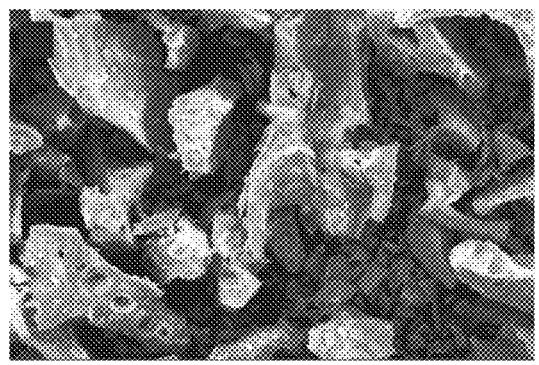
Figure 3G:
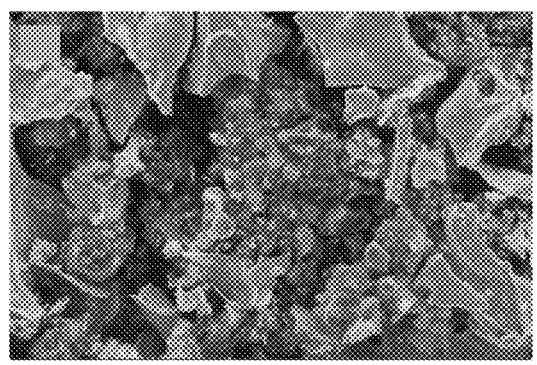
Figure 3H:
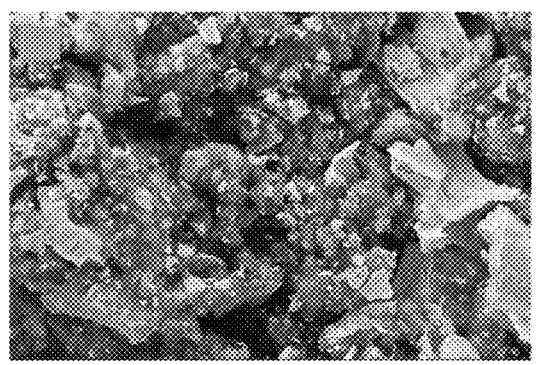

FIG. 3C shows the XRD pattern of 3 wt. % Ni loading on different ceria supports after the DRM test. There is a significant difference in the XRD patterns associated with the ceria supports. Little change in the Ni/CeO$_2$XRD pattern was observed after DRM. However, for Ni on Ce$_{0.5}$Ti$_{0.5}$O$_{2-\delta}$, intense diffraction peaks at 21.3°, 30.0°, 40.2°, 43.2°, 46.8°, 55.3° and 58.3° corresponding to (210), (112), (022), (420), ($\bar{1}$04), (304) and (232) of a new phase of Ce$_2$Ti$_2$O (JCPDS 47-0667) is formed and the peaks related with CeO$_2$ are significantly reduced in intensity. [70] The data suggest there is a phase change between Ce$_{0.5}$Ti$_{0.5}$O$_{2-\delta}$ containing segregated TiO$_2$ and Ce$_2$Ti$_2$O$_7$ during the DRM reaction, which is accompanied with a reduction of Ce$^{4+}$→Ce$^{3+}$. For Ni on Ce$_{0.7}$Ti$_{0.3}$O$_{2-\delta}$, the formation of new phase Ce$_2$Ti$_2$O$_7$ is also suggested. However, the predominant XRD peaks are associated with CeO$_2$. The XRD data of Ni over CeO$_2$ and Ce$_{0.7}$Ti$_{0.3}$O$_{2-\delta}$ suggest these samples largely maintain the ceria structure during the DRM process. In contrast, Ni over Ce$_{0.5}$Ti$_{0.5}$ O$_{2-\delta}$ produces the Ce$_2$Ti$_2$O$_7$ phase as a result of a reduction of Ce$^{4+}$→Ce$^{3+}$ during the reaction. In all three spent samples, additional XRD peaks located at 44.4° and 51.9° that are associated with metallic Ni (JCPDS 04-0850) were observed, which increase in the intensity with the amount of Ti doping in ceria. [71] The data is consistent with the suggestion that metallic Ni is the active species for DRM. There are no observable XRD peaks associated with deposited Ni among all the fresh catalysts. The presence of Ni XRD patterns in the spent samples could be due to the result of particle aggregation to form bigger sizes with heating during the DRM reaction and the nature of the ceria support can play an important role in that regard.

3.2 the Effect of Ni Weight Loadings

Figure 5A:
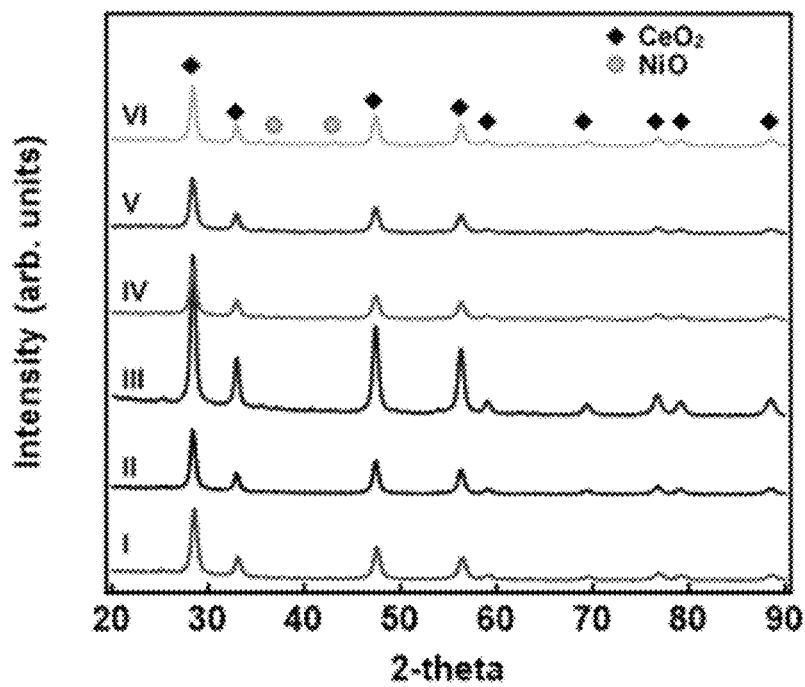
FIGS. 5A-5D. XRD patterns of (FIG. 5A) as-prepared samples and (FIG. 5B) spent samples of Ni/$Ce_{0.7}Ti_{0.3}O_{2-\delta}$ with the Ni loading of 0.0 wt. % (I), 0.5 wt. % (II), 1.2 wt. % (III), 2.4 wt. % (IV), 4.0 wt. % (V), and 10.8 wt. % (VI)

Ni loadings were varied during the catalyst synthesis to tune the optimum DRM performance. XRD patterns (FIG. 5A) were collected from as-prepared 0.5-10.8 wt. % Ni over the $Ce_{0.7}Ti_{0.3}O_{2-\delta}$ support. The indicated weight loading values of Ni were determined by ICP measurements. The $Ce_{0.7}Ti_{0.3}O_{2-\delta}$ support was selected due to the promotion in the DRM activity over supported Ni as discussed above. From 0.5 to 4.0 wt. % Ni loadings, the XRD patterns are similar to that of pure support, indicating Ni particles are well dispersed on the support. With further increase of Ni loadings to 10.8 wt. % on the support, new peaks at 37.1° and 43.1° are clearly shown in FIG. 5A. These peaks match well to the (111) and (200) planes of NiO (JCPDS 47-1049), suggesting the formation of NiO on $Ce_{0.7}Ti_{0.3}O_{2-\delta}$. [71] The amount of Ni added does not affect the lattice constant of ceria significantly, indicating that Ni anchors on the support surface other than permeating into the lattice. Based on the XRD data, the average crystallite size of NiO increases with respect to the Ni loading and the particle size was determined to be 24 nm for the 10.8 wt. % Ni supported over $Ce_{0.7}Ti_{0.3}O_{2-\delta}$.

Figure 5B:
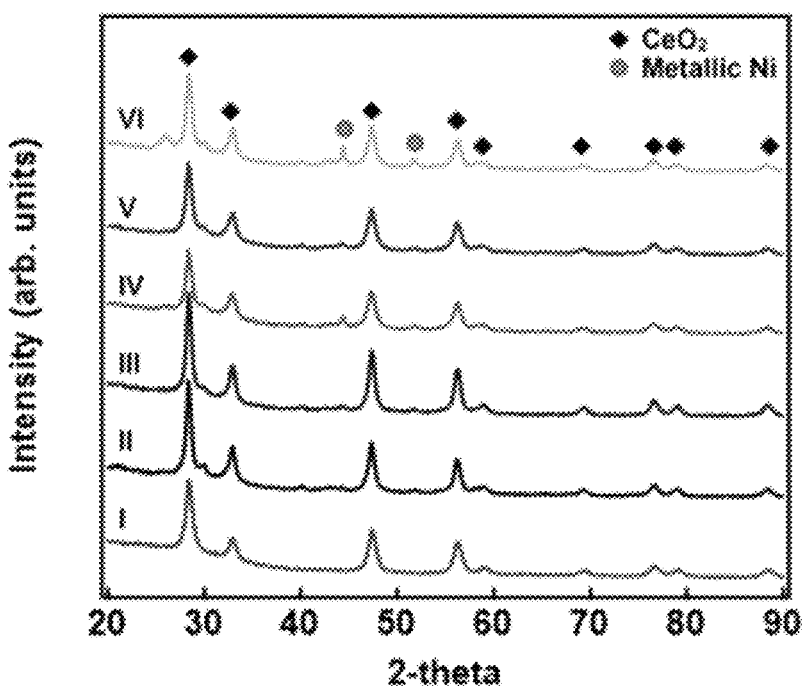
Figure 5C:
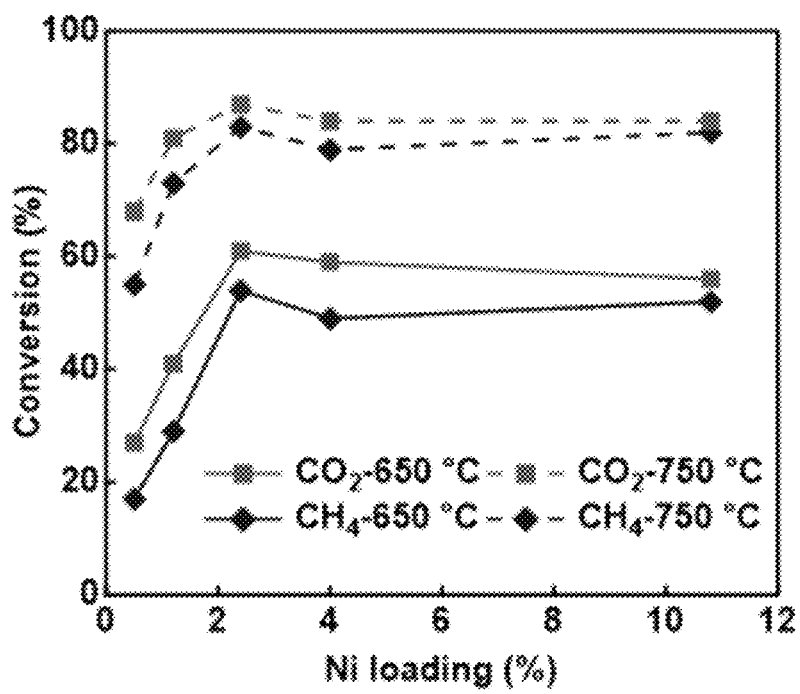
Figure 5D:
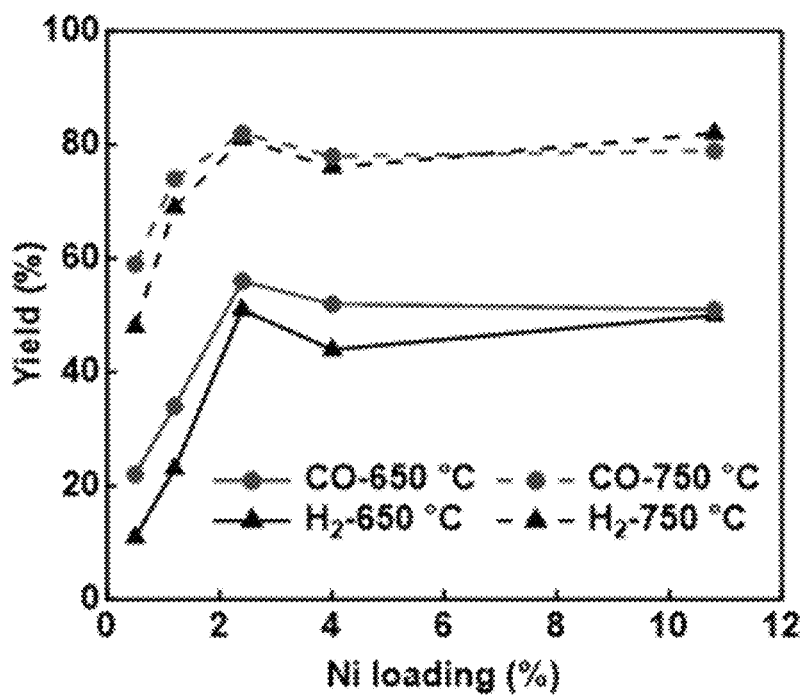

The DRM reaction is favored at high temperatures and it is not spontaneous at temperatures lower than 643° C. Coke formation is especially prominent in DRM between 550 and 700° C. due to the Boudouard reaction and methane decomposition. Therefore, it has been suggested that a desirable temperature range for the DRM process is 643-1027° C. with the pressure close to atmospheric. [2] FIGS. 5C and 5D compare the results of various Ni loadings between 0.5 and 10.8 wt. % on $Ce_{0.7}Ti_{0.3}O_{2-\delta}$ for the dry reforming of methane at two represented reaction temperatures of 650 and 750° C. The increase in the nickel loading from 0.5 to 2.4 wt. % results in a rapid increase in the $CH_4$ and $CO_2$ conversions. As shown, $CH_4$ conversion increases from 17% to 54% and $CO_2$ conversion increased from 27% to 61% at 650° C. Correspondingly, the product yields of $H_2$ and CO were increased from 11% and 22% to 51% and 56%, respectively. Further increase of the Ni loading does not increase the DRM activity. Similar activity trends with respect to the Ni loadings were also observed at 750° C. The results clearly show that 2.4 wt. % Ni supported on $Ce_{0.7}Ti_{0.3}O_{2-\delta}$ exhibits the best DRM activity despite the sample having a relatively low measured surface area of 26 $m^2/g$ and Ni metal surface area of 4.8 $m^2/g$ of nickel. Previous studies have demonstrated that the SMSI plays an important role in the reactivity of ceria-supported Ni. [72-74] Ni particles being in strong interactions with ceria supports are not easily subjected to form agglomerates and smaller Ni particles can effectively inhibit the coke formation. The better activity over 2.4 wt. % Ni supported on $Ce_{0.7}Ti_{0.3}O_{2-\delta}$ is likely due to the strong Ni-ceria interaction and formation of smaller Ni particles at this weight loading. X-ray photoelectron spectroscopy and transmission electron microscopy studies will be used to further investigate the interaction of Ni with respect to the nature of the support in our future study. XRD studies of spent samples suggest that metallic Ni is formed as evident with the peaks at 44.4° and 51.9° (FIG. 5B).

3.3 Stability Tests

Figure 6A:
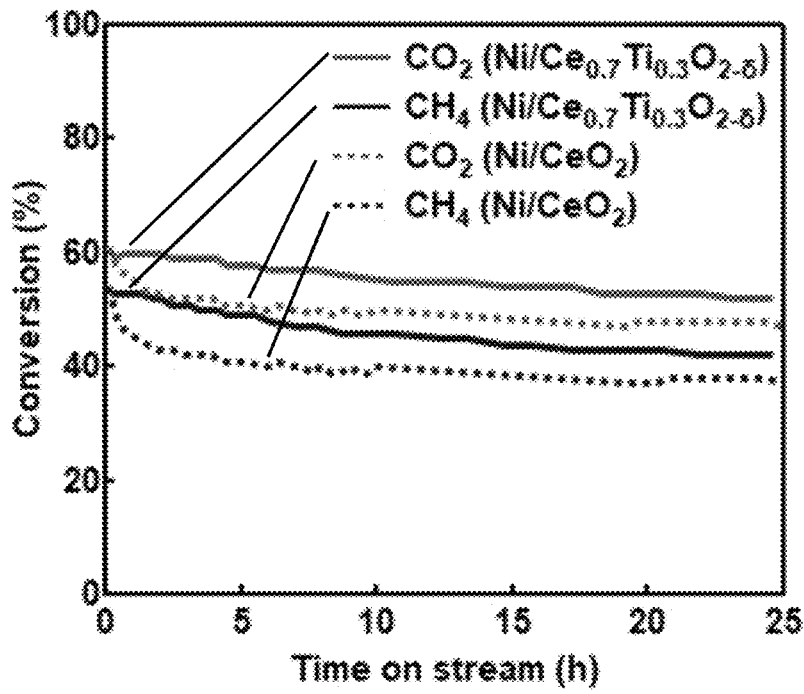
FIG. 6A. C02 and $CH_4$ conversions and (FIG. 6B) CO and $H_2$ yields from the DRM stability test at 650° C. for 25 hours for 2.4 wt. % Ni/$Ce_{0.7}Ti_{0.3}O_{2-\delta}$ and 3.1 wt. % Ni/$CeO_2$.
Figure 6B:
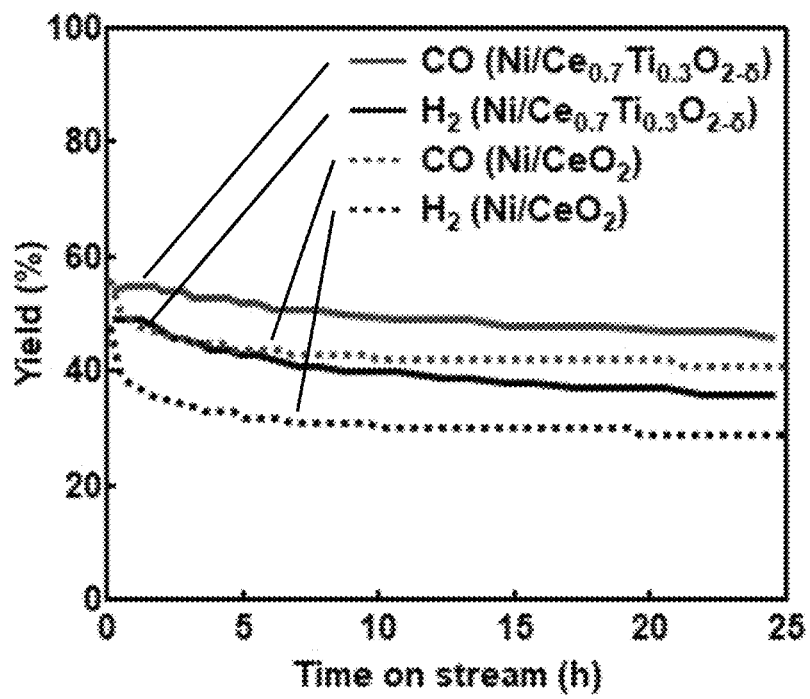
Figure 7A:
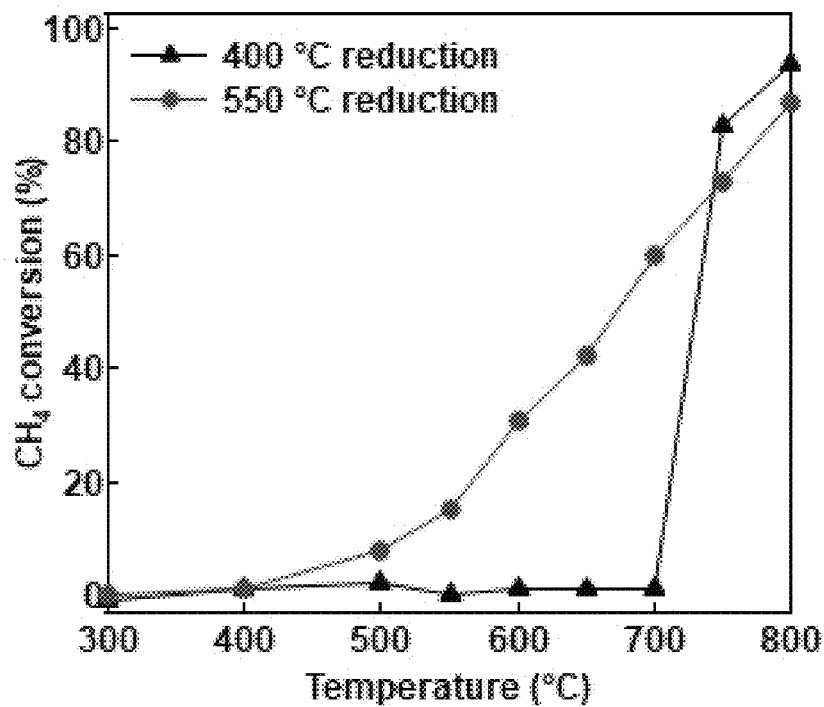
FIGS. 7A-D. Temperature-dependent DRM data of $CH_4$ conversion (FIG. 7A), $CO_2$ conversion (FIG. 7B), $H_2$ yield (FIG. 7C), and CO yield (FIG. 7D) for nominal 5.0 wt. % Ni dispersed over $Ce_{0.5}Ti_{0.5}O_{2-\delta}$. The samples were reduced in 20 mL $min^{-1}$ $H_2$ for one hour prior to the DRM reactivity test. One sample was reduced in $H_2$ at 400° C. and the other sample was reduced in $H_2$ at 550° C. The DRM activity data were compared with respect two different reduction temperatures.
Figure 7B:
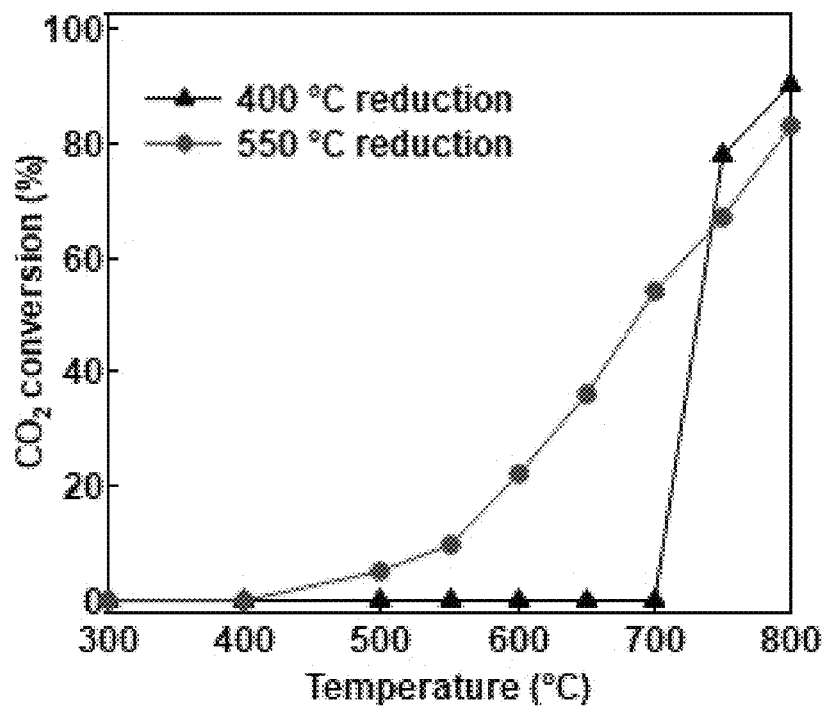
Figure 7C:
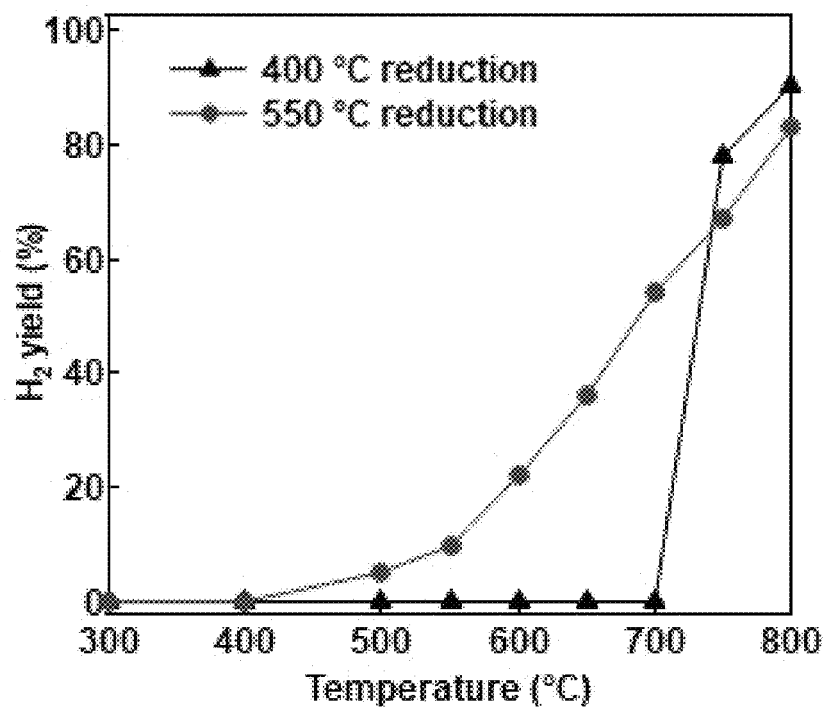
Figure 7D:
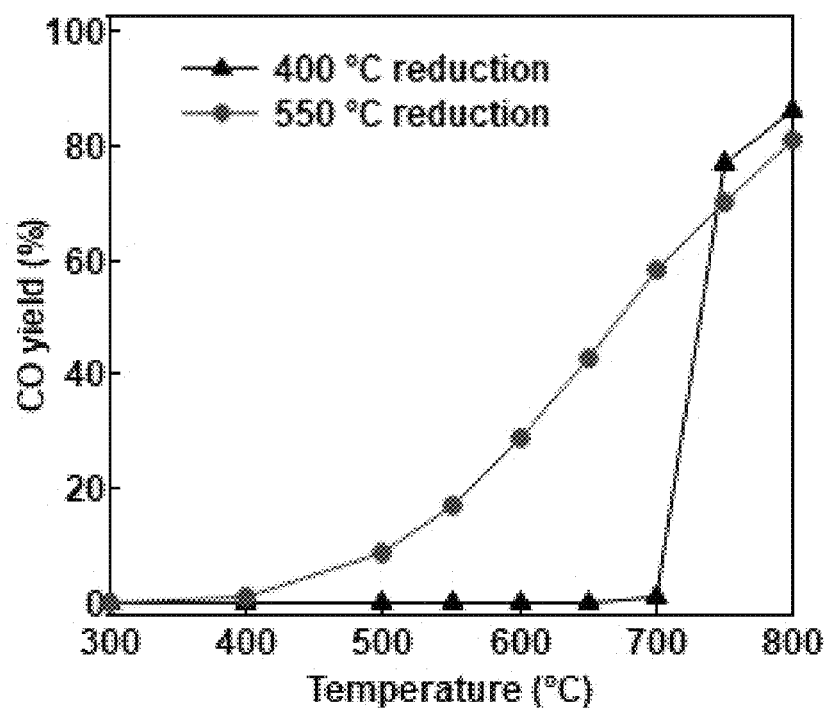

The stability test of the 2.4 wt. % $Ni/Ce_{0.7}Ti_{0.3}O_{2-\delta}$ sample for DRM was carried out at 650° C. as a function of time on stream and the result was compared to that of 3.1 wt. % $Ni/CeO_2$ (FIGS. 6A-6B). Both samples were prepared with a nominal Ni loading of 3 wt. %. At the start of the reaction, the $CH_4$ and $CO_2$ conversion over $Ni/CeO_2$ is 54% and 61% and the $H_2$ and CO yield is 48% and 56%, respectively. The sample lost DRM activity quickly within the first 5 hours and dropped a total of 17 and 14 percentage points in $CH_4$ and $CO_2$ conversion and 19 and 15 percentage points in $H_2$ yield during the course of the 25-hour reaction. Compared to $CeO_2$-supported Ni, $Ni/Ce_{0.7}Ti_{0.3}O_{2-\delta}$ shows much better stability. Doping Ti into ceria and the Ce:Ti ratio in $Ce_{1-x}Ti_xO_{2-\delta}$ can affect the DRM activity and stability of supported Ni. Out data indicate that an optimum result was obtained for Ni over $Ce_{1-x}Ti_xO_{2-\delta}$ with a Ti/Ce ratio of 3/7. Similar behavior was also observed for the DRM study of Ni supported over ceria doped with other metal elements. [75-77] The thermogravimetric analysis (TGA) of spent $Ni/Ce_{0.7}Ti_{0.3}O_{2-\delta}$ sample (data not shown) indicates there is 27% weight loss due to the formation of carbon during the DRM reaction. Most of the weight loss occurs at temperature less than 650° C., suggesting formation of amorphous carbon and surface carbide. [78, 79] These carbon species are active during the DRM reaction as they can serve as a reaction intermediate and assist in the formation of CO. [80] This explains the sustained DRM reactivity and good stability of Ni supported over $Ce_{0.7}Ti_{0.3}O_{2-\delta}$ in our study. The SEM images of the $Ni/Ce_{0.7}Ti_{0.3}O_{2-\delta}$ catalyst after 30 min and 50 h dry reforming of methane reaction are presented in FIGS. 3G and 3H. The morphology of these catalysts shows differences compared to the fresh $Ni/Ce_{0.7}Ti_{0.3}O_{2-\delta}$ catalyst. Loose-type structures were observed over the catalyst surface after the reaction, which is consistent with the formation of carbon deposit as suggested by TGA data.

This high activity and stability of the $Ni/Ce_{0.7}Ti_{0.3}O_{2-\delta}$ catalyst can be understood by examining the reaction mechanism. The $CH_4$ dissociates on the active Ni sites to form reactive carbon atoms with hydrogen atoms recombining and desorbing from the surface as $H_2$. [73] Ceria, as a highly basic support, is active toward $CO_2$. $CO_2$ activation can occur on the oxide support and/or at the Ni-oxide interfaces to form CO+O. CO then desorbs from the catalyst surface. During the reaction, oxygen from $CO_2$ decomposition can further recombine with surface C from Ni sites and desorb as CO. Additionally, oxygen could be released from the ceria lattice and react with C from Ni as a result of the redox properties and oxygen storage capacity of ceria. Removal of C from Ni can help reduce the accumulation of C deposits and thus the deactivation of Ni. Our data show that addition of $Ti^{4+}$ ions in ceria can promote the DRM activity and stability of Ni. This is consistent with the suggestion of the enhancement of the redox properties and oxygen storage capacities of ceria by Ti doping, which can result in a stronger metal-support interaction. [81-83] Further X-ray photoelectron spectroscopy and temperature-programmed reduction/oxidation experiments are underway to elucidate the nature of the oxygen storage capacity and redox properties of ceria with respect to Ti/Ce ratios.

4. CONCLUSIONS $Ce_{1-x}Ti_xO_{2-\delta}$ mixed oxides were synthesized with high Ce/Ti ratios. The activity of Ni depends on the Ce/Ti ratios in $Ce_{1-x}Ti_xO_{2-\delta}$, Ni loadings, and temperatures and 2.4 weight % Ni over $Ce_{0.7}Ti_{0.3}O_{2-\delta}$ shows promising reactivity and stability. In some embodiments, Ni is the active metal species in dry reforming of methane. We observed a new phase of $Ce_2Ti_2O$ forms in dry reforming of methane over $Ni/Ce_{0.5}Ti_{0.5}O_{2-\delta}$.

$Ce_{1-x}Ti_xO_{2-\delta}$ supports were synthesized using the sol-gel method and the formation of $Ce_{1-x}Ti_xO_{2-\delta}$ mixed oxides can be obtained with high Ce/Ti ratios. Nickel with 0.5-10 wt. % loadings over $Ce_{1-x}Ti_xO_{2-\delta}$ were prepared by the impregnation method. Small nanoparticles of Ni were dispersed on the surface of the support, which increases the size with respect to the weight loading. Our data have demonstrated that the DRM performance of supported Ni is dependent on the Ti concentrations in the ceria support, Ni loadings, and reaction temperatures. The 2.4 wt. % Ni supported on $Ce_{0.7}Ti_{0.3}O_{2-\delta}$ exhibits the best catalytic result. It shows initial DRM reactivity around 350° C. and delivers $CH_4$ and $CO_2$ conversions of 54% and 61% at 650° C., which increase to 92% and 94% with the $H_2/CO$ ratio close to unity when further increasing the temperature to 800° C. Only 11 percentage points of $CH_4$ conversion activity was lost within a 25 h reaction compared to 17 percentage points activity loss from $Ni/CeO_2$ despite the formation of C on the catalyst surface. Our data further suggest that metallic Ni is the active species and reduction of ceria occurs during DRM. For Ni supported on $Ce_{1-x}Ti_xO_{2-\delta}$ mixed oxides with lower Ce/Ti ratios, like $Ce_{0.5}Ti_{0.5}O_{2-\delta}$, a new phase of $Ce_2Ti_2O$ is formed during DRM. Doping of Ti in ceria can modify physical and electronic properties of ceria that can tune the activity and stability of supported Ni in the DRM reaction.

References Associated with Example 2

[1] D. Pakhare, J. Spivey, A Review of Dry (CO2) Reforming of Methane over Noble Metal Catalysts, Chem. Soc. Rev., 43 (2014) 7813-7837.
[2] S. Arora, R. Prasad, An Overview on Dry Reforming of Methane: Strategies to Reduce Carbonaceous Deactivation of Catalysts, RSC Adv., 6 (2016) 108668-108688.
[3] W. M. Haynes, CRC Handbook of Chemistry and Physics, 97th Edition, (2016).
[4] C. J. Winter, Hydrogen Energy-Abundant, Efficient, Clean: A Debate over the Energy-System-of-Change, Int. J. Hydrogen Energy, 34 (2009) S1-S52.
[5] M. M. Martin, Chapter 5—Syngas, in: M. M. Martin (Ed.) Industrial Chemical Process Analysis and Design, Elsevier, Boston, 2016, pp. 199-297.
[6] J. M. Lavoie, Review on Dry Reforming of Methane, A Potentially More Environmentally-Friendly Approach to the Increasing Natural Gas Exploitation, Front. Chem., 2 (2014) 1-17.
[7] R. Pitchai, K. Klier, Partial Oxidation of Methane, Cat. Rev.—Sci. Eng., 28 (1986) 13-88.
[8] A. Iulianelli, S. Liguori, J. Wilcox, A. Basile, Advances on Methane Steam Reforming to Produce Hydrogen Through Membrane Reactors Technology: A Review, Cat. Rev.—Sci. Eng., 58 (2016) 1-35.
[9] H. Jahangiri, J. Bennett, P. Mahjoubi, K. Wilson, S. Gu, A Review of Advanced Catalyst Development for Fischer-Tropsch Synthesis of Hydrocarbons From Biomass Derived Syn-Gas, Catal. Sci. Technol., 4 (2014) 2210-2229.
[10] J. R. H. Ross, Natural Gas Reforming and CO2 Mitigation, Catal. Today, 100 (2005) 151-158.
[11] H. O. Seo, Recent Scientific Progress on Developing Supported Ni Catalysts for Dry (CO2) Reforming of Methane, Catalysts, 8 (2018) 18.
[12] M. Mohamedali, A. Henni, H. Ibrahim, Recent Advances in Supported Metal Catalysts for Syngas Production from Methane, ChemEngineering, 2 (2018) 9.
[13] I. V. Yentekakis, G. Goula, M. Hatzisymeon, I. Betsi-Argyropoulou, G. Botzolaki, K. Kousi, D. I. Kondarides, M. J. Taylor, C. M. A. Parlett, A. Osatiashtiani, G. Kyriakou, J. P. Holgado, R. M. Lambert, Effect of Support Oxygen Storage Capacity on the Catalytic Performance of Rh Nanoparticles for CO2 Reforming of Methane, Appl. Catal. B: Environ., 243 (2019) 490-501.
[14] H. Y. Wang, E. Ruckenstein, Carbon Dioxide Reforming of Methane to Synthesis Gas over Supported Rhodium Catalysts: the Effect of Support, Appl. Catal. A: Gen., 204 (2000) 143-152.
[15] M. A. A. Aziz, A. A. Jalil, S. Wongsakulphasatch, D. V. N. Vo, Understanding the Role of Surface Basic Sites of Catalysts in CO2 Activation in Dry Reforming of Methane: A Short Review, Catal. Sci. Technol., 10 (2020) 35-45.
[16] S. B. Wang, G. Q. M. Lu, G. J. Millar, Carbon Dioxide Reforming of Methane to Produce Synthesis Gas over Metal-Supported Catalysts: State of the Art, Energy Fuels, 10 (1996) 896-904.
[17] B. Abdullah, N. A. A. Ghani, D. V. N. Vo, Recent Advances in Dry Reforming of Methane over Ni-Based Catalysts, J. Clean. Prod., 162 (2017) 170-185.
[18] J. F. Munera, L. M. Cornaglia, D. V. Cesar, M. Schmal, E. A. Lombardo, Kinetic Studies of the Dry Reforming of Methane over the Rh/La2O3-SiO2 Catalyst, Ind. Eng. Chem. Res., 46 (2007) 7543-7549.
[19] P. Ferreira-Aparicio, C. Marquez-Alvarez, I. Rodriguez-Ramos, Y. Schuurman, A. Guerrero-Ruiz, C. Mirodatos, A Transient Kinetic Study of the Carbon Dioxide Reforming of Methane over Supported Ru Catalysts, J. Catal., 184 (1999) 202-212.
[20] M. Garcia-Dieguez, I. S. Pieta, M. C. Herrera, M. A. Larrubia, L. J. Alemany, Nanostructured Pt- and Ni-Based Catalysts for C02-Reforming of Methane, J. Catal., 270 (2010) 136-145.
[21] Z. Y. Liu, F. Zhang, N. Rui, X. Li, L. L. Lin, L. E. Betancourt, D. Su, W. Q. Xu, J. J. Cen, K. Attenkofer, H. Idriss, J. A. Rodriguez, S. D. Senanayake, Highly Active Ceria-Supported Ru Catalyst for the Dry Reforming of Methane: In Situ Identification of $Ru\delta+-Ce3+$ Interactions for Enhanced Conversion, ACS Catal., 9 (2019) 3349-3359.
[22] Z. Y. Liu, D. C. Grinter, P. G. Lustemberg, T. D. Nguyen-Phan, Y. H. Zhou, S. Luo, I. Waluyo, E. J. Crumlin, D. J. Stacchiola, J. Zhou, J. Carrasco, H. F. Busnengo, M. V. Ganduglia-Pirovano, S. D. Senanayake, J. A. Rodriguez, Dry Reforming of Methane on a Highly-Active Ni—CeO2 Catalyst: Effects of Metal-Support Interactions on C—H Bond Breaking, Angew. Chem. Int. Ed., 55 (2016) 7455-7459.
[23] M. D. Argyle, C. H. Bartholomew, Heterogeneous Catalyst Deactivation and Regeneration: A Review, Catalysts, 5 (2015) 145-269.
[24] F. Pompeo, N. N. Nichio, M. M. V. M. Souza, D. V. Cesar, O. A. Ferretti, M. Schmal, Study of Ni and Pt Catalysts Supported on $\alpha$-Al2O3 and ZrO2 Applied in Methane Reforming with CO2, Appl. Catal. A: Gen., 316 (2007) 175-183.
[25] V. M. Shinde, G. Madras, Catalytic Performance of Highly Dispersed Ni/TiO2 for Dry and Steam Reforming of Methane, RSC Adv., 4 (2014) 4817-4826.
[26] C. Z. Wang, X. Y. Jie, Y. Qiu, Y. X. Zhao, H. A. Al-Megren, S. Alshihri, P P. Edwards, T. C. Xiao, The Importance of Inner Cavity Space within Ni@SiO2 Nanocapsule Catalysts for Excellent Coking Resistance in the High-Space-Velocity Dry Reforming of Methane, Appl. Catal. B: Environ., 259 (2019).

[27] J. J. Guo, H. Lou, H. Zhao, D. F. Chai, X. M. Zheng, Dry Reforming of Methane over Nickel Catalysts Supported on Magnesium Aluminate Spinels, Appl. Catal. A: Gen., 273 (2004) 75-82.

[28] M. Zhang, J. F. Zhang, Z. L. Zhou, S. Y. Chen, T. Zhang, F. E. Song, Q. D. Zhang, N. Tsubaki, Y. S. Tan, Y. Z. Han, Effects of the Surface Adsorbed Oxygen Species Tuned by Rare-Earth Metal Doping on Dry Reforming of Methane over Ni/ZrO2 Catalyst, Appl. Catal. B: Environ., 264 (2020) 118666.

[29] S. M. Lima, J. M. Assaf, M. A. Pena, J. L. G. Fierro, Structural Features of La1-xCexNiO3 Mixed Oxides and Performance for the Dry Reforming of Methane, Appl. Catal. A: Gen., 311 (2006) 94-104.

[30] P. Djinovic, J. Batista, A. Pintar, Efficient Catalytic Abatement of Greenhouse Gases: Methane Reforming with CO2 Using a Novel and Thermally Stable Rh—CeO2 Catalyst, Int. J. Hydrogen Energy, 37 (2012) 2699-2707.

[31] S. Damyanova, B. Pawelec, K. Arishtirova, M. V. M. Huerta, J. L. G. Fierro, The Effect of CeO2 on the Surface and Catalytic Properties of Pt/CeO2-ZrO2 Catalysts for Methane Dry Reforming, Appl. Catal. B: Environ., 89 (2009) 149-159.

[32] Z. H. Xie, B. H. Yan, S. Kattel, J. H. Lee, S. Y. Yao, Q. Y. Wu, N. Rui, E. Gomez, Z. Y. Liu, W. Q. Xu, L. Zhang, J. G. G. Chen, Dry Reforming of Methane over $CeO_2$-Supported Pt—Co Catalysts with Enhanced Activity, Appl. Catal. B: Environ., 236 (2018) 280-293.

[33] J. Graciani, K. Mudiyanselage, F. Xu, A. E. Baber, J. Evans, S. D. Senanayake, D. J. Stacchiola, P. Liu, J. Hrbek, J. F. Sanz, J. A. Rodriguez, Highly Active Copper-Ceria and Copper-Ceria-Titania Catalysts for Methanol Dynthesis from CO2, Science, 345 (2014) 546-550.

[34] F. Wang, C. M. Li, X. Y. Zhang, M. Wei, D. G. Evans, X. Duan, Catalytic Behavior of Supported Ru Nanoparticles on the {100}, {110}, and {111} Facet of CeO2, J. Catal., 329 (2015) 177-186.

[35] H. Ay, D. Uner, Dry Reforming of Methane over CeO2 Supported Ni, Co and Ni—Co Catalysts, Appl. Catal. B: Environ., 179 (2015) 128-138.

[36] S. D. Senanayake, J. Evans, S. Agnoli, L. Barrio, T. L. Chen, J. Hrbek, J. A. Rodriguez, Water-Gas Shift and CO Methanation Reactions over Ni—CeO2(111) Catalysts, Top. Catal., 54 (2011) 34-41.

[37] S. D. Senanayake, P. J. Ramirez, I. Waluyo, S. Kundu, K. Mudiyanselage, Z. Y. Liu, Z. Liu, S. Axnanda, D. J. Stacchiola, J. Evans, J. A. Rodriguez, Hydrogenation of CO2 to Methanol on CeOx/Cu(111) and ZnO/Cu(111) Catalysts: Role of the Metal-Oxide Interface and Importance of Ce3+ Sites, J. Phys. Chem. C, 120 (2016) 1778-1784.

[38] V. M. Gonzalez-DelaCruz, J. P. Holgado, R. Pereniguez, A. Caballero, Morphology Changes Induced by Strong Metal-Dupport Interaction on a Ni-Ceria Catalytic System, J. Catal., 257 (2008) 307-314.

[39] W. J. Cai, L. Ye, L. Zhang, Y. H. Ren, B. Yue, X. Y. Chen, H. Y. He, Highly Dispersed Nickel-Containing Mesoporous Silica with Superior Stability in Carbon Dioxide Reforming of Methane: The Effect of Anchoring, Materials, 7 (2014) 2340-2355.

[40] B. H. Yan, X. F. Yang, S. Y. Yao, J. Wan, M. Myint, E. Gomez, Z. H. Xie, S. Kattel, W. Q. Xu, J. G. G. Chen, Dry Reforming of Ethane and Butane with CO2 over PtNi/CeO2 Bimetallic Catalysts, ACS Catal., 6 (2016) 7283-7292.

[41] A. Siahvashi, A. A. Adesina, Kinetic Study of Propane CO2 Reforming over Bimetallic Mo—Ni/Al2O3 Catalyst, Ind. Eng. Chem. Res., 52 (2013) 15377-15386.

[42] Z. H. Xie, B. H. Yan, J. H. Lee, Q. Y. Wu, X. Li, B. H. Zhao, D. Su, L. Zhang, J. G. G. Chen, Effects of Oxide Supports on the CO2 Reforming of Ethane over Pt—Ni Bimetallic Catalysts, Appl. Catal. B: Environ., 245 (2019) 376-388.

[43] I. Luisetto, S. Tuti, E. Di Bartolomeo, Co and Ni Supported on CeO2 as Selective Bimetallic Catalyst for Dry Reforming of Methane, Int. J. Hydrogen Energy, 37 (2012) 15992-15999.

[44] I. Luisetto, S. Tuti, C. Romano, M. Boaro, E. Di Bartolomeo, Dry Reforming of Methane over Ni Supported on Doped CeO2: New Insight on the Role of Dopants for CO2 Activation, J. CO2 Util., 30 (2019) 63-78.

[45] C. M. Damaskinos, M. A. Vasiliades, A. M. Efstathiou, The Effect of Ti4+ Dopant in the 5 wt % Ni/Ce1-xTixO2-δ Catalyst on the Carbon Pathways of Dry Reforming of Methane Studied by Various Transient and Isotopic Techniques, Appl. Catal. A: Gen., 579 (2019) 116-129.

[46] T. Montini, M. Melchionna, M. Monai, P. Fornasiero, Fundamentals and Catalytic Applications of CeO2-Based Materials, Chem. Rev., 116 (2016) 5987-6041.

[47] A. Figueroba, A. Bruix, G. Kovacs, K. M. Neyman, Metal-Doped Ceria Nanoparticles: Stability and Redox Processes, PCCP, 19 (2017) 21729-21738.

[48] F. J. Lin, I. Alxneit, A. Wokaun, Structural and Chemical Changes of Zn-Doped CeO2 Nanocrystals upon Annealing at Ultra-High Temperatures, Crystengcomm, 17 (2015) 1646-1653.

[49] W. T. Chen, K. B. Chen, M. F. Wang, S. F. Weng, C. S. Lee, M. C. Lin, Enhanced Catalytic Activity of Ce1-xMxO2 (M=Ti, Zr, and Hf) Solid Solution with Controlled Morphologies, Chem. Commun., 46 (2010) 3286-3288.

[50] Y. Liu, C. Wen, Y. Guo, G. Z. Lu, Y. Q. Wang, Modulated CO Oxidation Activity of M-Doped Ceria (M=Cu, Ti, Zr, and Tb): Role of the Pauling Electronegativity of M, J. Phys. Chem. C, 114 (2010) 9889-9897.

[51] Y. Yu, L. Zhong, J. Ding, W. Cai, Q. Zhong, Cobalt Supported on Metal-Doped Ceria Catalysts (M=Zr, Sn and Ti) for NO Oxidation, RSC Adv., 5 (2015) 23193-23201.

[52] S. Watanabe, X. L. Ma, C. S. Song, Characterization of Structural and Surface Properties of Nanocrystalline TiO2-CeO2 Mixed Oxides by XRD, XPS, TPR, and TPD, J. Phys. Chem. C, 113 (2009) 14249-14257.

[53] F. Zhang, Z. Y. Liu, X. B. Chen, N. Rui, L. E. Betancourt, L. L. Lin, W. Q. Xu, C. J. Sun, A. M. M. Abeykoon, J. A. Rodriguez, J. Terzan, K. Lorber, P. Djinovic, S. D. Senanayake, Effects of Zr Doping into Ceria for the Dry Reforming of Methane over Ni/CeZrO2 Catalysts: In Situ Studies with XRD, XAFS, and AP-XPS, ACS Catal., 10 (2020) 3274-3284.

[54] M. Nakayama, M. Martin, First-Principles Study on Defect Chemistry and Migration of Oxide Ions in Ceria Doped with Rare-Earth Cations, PCCP, 11 (2009) 3241-3249.

[55] Y. H. Zhou, J. Zhou, Growth and Surface Structure of Ti-Doped CeOx(111) Thin Films, J. Phys. Chem. Lett., 1 (2010) 1714-1720.

[56] M. Nolan, Molecular Adsorption on the Doped (110) Ceria Surface, J. Phys. Chem. C, 113 (2009) 2425-2432.

[57] K. C. Petallidou, K. Polychronopoulou, S. Boghosian, S. Garcia-Rodriguez, A. M. Efstathiou, Water-Gas Shift Reaction on Pt/Ce1-xTixO2-δ: The Effect of Ce/Ti Ratio, J. Phys. Chem. C, 117 (2013) 25467-25477.

[58] S. S. Kim, S. M. Lee, J. M. Won, H. J. Yang, S. C. Hong, Effect of Ce/Ti Ratio on the Catalytic Activity and Stability of Ni/CeO2-TiO2 Catalyst for Dry Reforming of Methane, Chem. Eng. J., 280 (2015) 433-440.

[59] L. Du, E. Ginting, J. Zhou, Morphology and Chemical States of Ni Supported on Ti-Modified CeOx(111) Interfaces, Surf. Sci., 699 (2020) 121624.

[60] Y. Zhou, J. Zhou, Ti/CeOx(111) Interfaces Studied by XPS and STM, Surf. Sci., 606 (2012) 749-753.

[61] A. Djaidja, S. Libs, A. Kiennemann, A. Barama, Characterization and Activity in Dry Reforming of Methane on NiMg/Al and Ni/MgO Catalysts, Catal. Today, 113 (2006) 194-200.

[62] A. Wolfbeisser, O. Sophiphun, J. Bernardi, J. Wittayakun, K. Fottinger, G. Rupprechter, Methane Dry Reforming over Ceria-Zirconia Supported Ni Catalysts, Catal. Today, 277 (2016) 234-245.

[63] R. D. Shannon, Revised Effective Ionic-Radii and Systematic Studies of Interatomic Distances in Halides and Chalcogenides, Acta Crystallogr. A, 32 (1976) 751-767.

[64] M. Amin, A Mini-Review on $CO_2$ Reforming of Methane, Prog. Pet Sci, 2 (2018).

[65] X. J. Du, D. S. Zhang, L. Y. Shi, R. H. Gao, J. P. Zhang, Morphology Dependence of Catalytic Properties of Ni/$CeO_2$ Nanostructures for Carbon Dioxide Reforming of Methane, J. Phys. Chem. C, 116 (2012) 10009-10016.

[66] D. G. Araiza, D. G. Arcos, A. Gómez-Cortés, G. Díaz, Dry Reforming of Methane over Pt—Ni/CeO2 Catalysts: Effect of the Metal Composition on the Stability, Catal. Today, (2019).

[67] N. Wang, W. Z. Qian, W. Chu, F. Wei, Crystal-Plane Effect of Nanoscale CeO2 on the Catalytic Performance of Ni/CeO2 Catalysts for Methane Dry Reforming, Catal. Sci. Technol., 6 (2016) 3594-3605.

[68] K. Chang, H. C. Zhang, M. J. Cheng, Q. Lu, Application of Ceria in CO2 Conversion Catalysis, ACS Catal., 10 (2020) 613-631.

[69] S. J. Hassani Rad, M. Haghighi, A. Alizadeh Eslami, F. Rahmani, N. Rahemi, Sol-Gel vs. Impregnation Preparation of MgO and CeO2 Doped Ni/Al2O3 Nanocatalysts Used in Dry reforming of Methane: Effect of Process Conditions, Synthesis Method and Support Composition, Int. J. Hydrogen Energy, 41 (2016) 5335-5350.

[70] A. Preuss, R. Gruehn, Preparation and Structure of Cerium Titanates Ce2TiO5, Ce2Ti2O7, and Ce4Ti9O24, J. Solid State Chem., 110 (1994) 363-369.

[71] V. D. Jovic, V. Maksimovic, M. G. Pavlovic, K. I. Popov, Morphology, Internal Tructure and Growth Mechanism of Electrodeposited Ni and Co Powders, J. Solid State Electrochem., 10 (2006) 373-379.

[72] W. Q. Xu, Z. Y. Liu, A. C. Johnston-Peck, S. D. Senanayake, G. Zhou, D. Stacchiola, E. A. Stach, J. A. Rodriguez, Steam Reforming of Ethanol on Ni/CeO2: Reaction Pathway and Interaction between Ni and the CeO2 Support, ACS Catal., 3 (2013) 975-984.

[73] P. G. Lustemberg, P. J. Ramirez, Z. Y. Liu, R. A. Gutierrez, D. G. Grinter, J. Carrasco, S. D. Senanayake, J. A. Rodriguez, M. V. Ganduglia-Pirovano, Room-Temperature Activation of Methane and Dry Re-forming with CO2 on Ni—CeO2(111) Surfaces: Effect of Ce3+ Sites and Metal-Support Interactions on C—H Bond Cleavage, ACS Catal., 6 (2016) 8184-8191.

[74] Z. Y. Liu, T. Duchon, H. R. Wang, D. C. Grinter, I. Waluyo, J. Zhou, Q. Liu, B. Jeong, E. J. Crumlin, V. Matolin, D. J. Stacchiola, J. A. Rodriguez, S. D. Senanayake, Ambient Pressure XPS and IRRAS Investigation of Ethanol Steam Reforming on Ni—CeO2(111) Catalysts: An In Situ Study of C—C and O—H Bond Scission, PCCP, 18 (2016) 16621-16628.

[75] M. A. Munoz, J. J. Calvino, J. M. Rodriguez-Izquierdo, G. Blanco, D. C. Arias, J. A. Perez-Omil, J. C. Hernandez-Garrido, J. M. Gonzalez-Leal, M. A. Cauqui, M. P. Yeste, Highly Stable Ceria-Zirconia-Yttria Supported Ni Catalysts for Syngas Production by CO2 Reforming of Methane, Appl. Surf. Sci., 426 (2017) 864-873.

[76] P. Kumar, Y. Sun, R. O. Idem, Nickel-Based Ceria, Zirconia, and Ceria-Zirconia Catalytic Systems for Low-Temperature Carbon Dioxide Reforming of Methane, Energy Fuels, 21 (2007) 3113-3123.

[77] A. Kambolis, H. Matralis, A. Trovarelli, C. Papadopoulou, Ni/CeO2-ZrO2 Catalysts for the Dry Reforming of Methane, Appl. Catal. A: Gen., 377 (2010) 16-26.

[78] J. H. Lehman, M. Terrones, E. Mansfield, K. E. Hurst, V. Meunier, Evaluating the Characteristics of Multiwall Carbon Nanotubes, Carbon, 49 (2011) 2581-2602.

[79] A. M. F. Lima, A. W. Musumeci, H.-W. Liu, E. R. Waclawik, G. G. Silva, Purity Evaluation and Influence of Carbon Nanotube on Carbon Nanotube/Graphite Thermal Stability, J. Therm. Anal. Calorim., 97 (2009).

[80] X. L. Yan, T. Hu, P. Liu, S. Li, B. R. Zhao, Q. Zhang, W. Y. Jiao, S. Chen, P. F. Wang, J. J. Lu, L. M. Fan, X. N. Deng, Y. X. Pan, Highly Efficient and Stable Ni/CeO2-SiO2 Catalyst for Dry Reforming of Methane: Effect of Interfacial Structure of Ni/CeO2 on SiO2, Appl. Catal. B: Environ., 246 (2019) 221-231.

[81] B. M. Reddy, A. Khan, Nanosized CeO2-SiO2, CeO2-TiO2, and CeO2-ZrO2 Mixed Oxides: Influence of Supporting Oxide on Thermal Stability and Oxygen Storage Properties of Ceria, Catal. Surv. from Asia, 9 (2005) 155-171.

[82] B. Bharti, S. Kumar, H. N. Lee, R. Kumar, Formation of Oxygen Vacancies and Ti3+ State in TiO2 Thin Film and Enhanced Optical Properties by Air Plasma Treatment, Sci Rep, 6 (2016) 12.

[83] C. T. Campbell, C. H. F. Peden, Oxygen Vacancies and Catalysis on Ceria Surfaces, Science, 309 (2005) 713-714.

Example 3: Temperature-Dependent DRM Data of CH4 Conversion

FIGS. 7A-D provide plots showing temperature dependence for DRM reactivity experiments using the present methods including $CH_4$ conversion (FIG. 7A), $CO_2$ conversion (FIG. 7B), $H_2$ yield (FIG. 7C), and CO yield (FIG. 7D) for nominal 5.0 wt. % Ni dispersed over $Ce_{0.5}Ti_{0.5}O_{2-\delta}$. The samples were reduced in 20 mL min$^{-1}$ $H_2$ for one hour prior to the DRM reactivity test. One sample was reduced in $H_2$ at 400° C. (triangle markers) and the other sample was reduced in $H_2$ at 550° C. (circle markers). The DRM activity data were compared with respect two different reduction temperatures.

In some embodiments, metallic Ni is the active species for methane activation in DRM. For example, NiO is formed over the ceria support during synthesis, which can be reduced to metallic Ni with $H_2$. As shown in FIGS. 4A-4F, 3.0 wt. % Ni/$CeO_2$ and 2.4 wt. % Ni/$Ce_{0.7}Ti_{0.3}O_{2-\delta}$ catalysts show good DRM activity with reduction at 400° C. for one hour in $H_2$ with a flow rate of 20 mL min$^{-1}$ As shown in FIGS. 7A-D, Ni dispersed over $Ce_{0.5}Ti_{0.5}O_{2-\delta}$ exhibits catalyst activation at higher reduction temperature (e.g. 550° C.). These results demonstrate that Ti doping in ceria may influence the interaction between ceria and supported Ni which plays an important role in the DRM activity.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a Markush group or other grouping is used herein, all individual members of the group and all combinations and subcombinations possible of the group are intended to be individually included in the disclosure. Every formulation or combination of components described or exemplified can be used to practice the invention, unless otherwise stated. Specific names of compounds are intended to be exemplary, as it is known that one of ordinary skill in the art can name the same compounds differently.

One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

The invention illustratively described herein suitably may be practiced in the absence of any element or elements, limitation or limitations which is not specifically disclosed herein.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

Every material, system, formulation, combination of components, or method described or exemplified herein can be used to practice the invention, unless otherwise stated.

Whenever a range is given in the specification, for example, a temperature range, a time range, a composition or a concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method for processing a hydrocarbon feedstock, the method comprising the steps of:
    contacting said hydrocarbon feedstock with a doped ceria-supported metal catalyst comprising a solid oxide solution of Ti-doped ceria as a support and dispersed metal particles, thereby generating a syngas product comprising $H_2$ and CO;
    wherein said doped ceria-supported metal catalyst is of the formula (FX1):

    $$M/Ce_{1-x}Ti_xO_{2-\delta} \quad (FX1);$$

wherein M is one or more metals selected from Ni, Co, Pd, and Pt, x is a number selected from the range of 0.27 to 0.33 and wherein δ represents oxygen deficiency;
    wherein said hydrocarbon feedstock comprises methane with one or more additional hydrocarbon components and $CO_2$ or wherein said hydrocarbon feedstock is a product from cement processing, steel processing, coal refining, or petrochemical refining, crude oil production, natural gas production, coal mining or minerals mining; and
    wherein the molar ratio of Ce to Ti is selected from the range of 2.0 to 2.7.

2. The method of claim 1, wherein said method is for dry reforming of methane.

3. The method of claim 1, wherein said hydrocarbon feedstock is obtained or derived from an industrial process that generates both carbon dioxide and methane, or an industrial process that generates carbon dioxide in proximity to a source of methane.

4. The method of claim 1, wherein said hydrocarbon feedstock further comprises a product from one or more processes selected from the group of:
    i. a coal pyrolysis process;
    ii. a petrochemical oxidization process;
    iii. a sintering process;
    iv. a furnace process;
    v. a kiln process;
    vi. a steam reforming process;
    vii. an ammonia production process;
    viii. a fuel production or treatment process;
    ix. a mining process; and
    x. any process that produces carbon dioxide.

5. The method of claim 1, wherein said doped ceria-supported metal catalyst comprises said one or more metals (M) dispersed on a Ti-doped metal oxide support characterized by the formula $Ce_{1-x}Ti_xO_{2-\delta}$; wherein said doped catalyst support maintains the cubic fluorite crystal structure of pure ceria ($CeO_2$) and produces mixed metal oxides.

6. The method of claim 1, wherein said one or more metals (M) are provided as particles or clusters having an average size dimension up to 1 micron and wherein the weight percent of said one or more metals (M) in the catalyst is selected from the range of 0.1-20 wt. %.

7. The method of claim 1, wherein said one or more metals (M) in formula (FX1) is Ni, and wherein Ni has a weight percent in the catalyst selected from the range of 1.5-7 wt. %.

8. The method of claim 1, wherein said one or more metals (M) in formula (FX1) is Ni, and wherein Ni has a weight percent in the catalyst of 2.4±0.5 wt. %.

9. The method of claim 1, wherein the molar ratio of Ce to Ti is 2.3±0.3.

10. The method of claim 1, wherein said one or more metals (M) in formula (FX1) is Ni, wherein the weight percent of Ni in the catalyst is selected from the range of 2.0-3.0 wt. %.

11. The method of claim 1, wherein said method is characterized by a methane conversion efficiency equal to or greater than 70% at a temperature of 650° C. or greater.

12. The method of claim 1, wherein said method is characterized by a ratio of $H_2$ produced to CO produced equal to or greater than 0.9% at a temperature of 650° C. or greater.

* * * * *

UNITED STATES PATENT AND TRADEMARK OFFICE
CERTIFICATE OF CORRECTION

PATENT NO. : 11,964,257 B2
APPLICATION NO. : 17/082406
DATED : April 23, 2024
INVENTOR(S) : Jing Zhou et al.

It is certified that error appears in the above-identified patent and that said Letters Patent is hereby corrected as shown below:

In the Claims

In Column 38, in Claim 12, Line 42, please delete the "%" following 0.9.

Signed and Sealed this
Eighteenth Day of June, 2024

Katherine Kelly Vidal
*Director of the United States Patent and Trademark Office*